US012665440B2

(12) United States Patent
Ju et al.

(10) Patent No.: US 12,665,440 B2
(45) Date of Patent: Jun. 23, 2026

(54) ELECTRONIC DEVICE FOR WIRELESS POWER TRANSFER

(71) Applicant: SAMSUNG ELECTRONICS CO., LTD., Suwon-si (KR)

(72) Inventors: Indon Ju, Suwon-si (KR); Jaehun Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 734 days.

(21) Appl. No.: 18/192,927

(22) Filed: Mar. 30, 2023

(65) Prior Publication Data

US 2023/0238828 A1      Jul. 27, 2023

Related U.S. Application Data

(63) Continuation of application No. PCT/KR2021/002222, filed on Feb. 23, 2021.

(30) Foreign Application Priority Data

Dec. 16, 2020    (KR) ........................ 10-2020-0176415

(51) Int. Cl.
*H02J 50/10*        (2016.01)
*H02J 50/80*        (2016.01)
(52) U.S. Cl.
CPC .............. *H02J 50/10* (2016.02); *H02J 50/80* (2016.02)
(58) Field of Classification Search
CPC ...................................................... H02J 50/10

USPC ......................................................... 320/108
See application file for complete search history.

(56) References Cited

U.S. PATENT DOCUMENTS

| | | | |
|---|---|---|---|
| 10,291,058 | B2 | 5/2019 | Kato et al. |
| 2020/0144837 | A1 | 5/2020 | To et al. |
| 2020/0227935 | A1 | 7/2020 | Mehta et al. |

FOREIGN PATENT DOCUMENTS

| | | |
|---|---|---|
| KR | 20150031852 A | 3/2015 |
| KR | 101696443 B1 | 2/2017 |
| KR | 20190000363 A | 1/2019 |
| KR | 10-2020-0041446 A | 4/2020 |
| KR | 20200085453 A | 7/2020 |
| KR | 20200101225 A | 8/2020 |
| WO | 2014052070 A1 | 4/2014 |
| WO | 2016200908 A1 | 12/2016 |

OTHER PUBLICATIONS

Korean Notice of Allowance dated Jun. 13, 2025 for KR Application No. 10-2020-0176415.
Korean Office Action dated Mar. 14, 2025 for KR Application No. 10-2020-0176415.

*Primary Examiner* — Ahmed H Omar
(74) *Attorney, Agent, or Firm* — Nixon & Vanderhye P.C.

(57) ABSTRACT

An electronic device may receive wireless power from a wireless charger device by bypassing an external device in which a coil is isolated. The electronic device may directly supply power received from the external device to an element for executing an operation, without passing through a battery, according to a battery state, or wirelessly share its own power with the external device.

15 Claims, 16 Drawing Sheets

200

1790

1710

1720 or

When charged to predetermined amount or connected to external power source

ELECTRONIC DEVICE FOR WIRELESS POWER TRANSFER

CROSS-REFERENCE TO RELATED APPLICATIONS

This application is a continuation application of International Application No. PCT/KR2021/002222 designating the United States, filed on Feb. 23, 2021, in the Korean Intellectual Property Receiving Office and claiming priority to Korean Patent Application No. 10-2020-0176415 filed on Dec. 16, 2020, in the Korean Intellectual Property Office, the disclosures of all of which are hereby incorporated by reference herein in their entireties.

BACKGROUND

Field

Certain example embodiments relate to an electronic device for wireless power transfer.

Description of Related Art

Research on wireless power transfer has been started to overcome an increase in inconveniences of wired power supplies, or the limited capacity of conventional batteries, due to an explosive increase in various electronic devices including electric vehicles and mobile devices. One of wireless power transfer technologies uses resonance characteristics of radio frequency (RF) devices. A wireless power transfer system using resonance characteristics may include a source that supplies power and a target that receives power.

SUMMARY

When an external device is coupled to an electronic device, the charging efficiency of a wireless charger device may vary.

An electronic device may transmit power to an external device from which a battery is absent or of which remaining battery power lacks using a wireless power transfer method other than near-field communication (NFC). Power for driving an external device may vary depending on a battery state of the external device and a battery state of an electronic device.

According to an example embodiment, an electronic device may include a processor, a memory electrically connected, directly or indirectly, to the processor, a wireless power transmission/reception module, comprising circuitry, configured to perform wireless power transfer with at least one of a wireless charger device and an external device, a battery configured to be charged by power received from the wireless charger device, and a communication module, comprising communication circuitry, configured to establish communication with the external device, wherein the processor may be configured to transmit charging identification information indicating a start of charging the electronic device to the external device through the communication module, in response to detecting a charging signal from the wireless charger device, receive power provided from the wireless charger device through the wireless power transmission/reception module by bypassing the external device after power reception of the external device is deactivated, and charge the battery using the power received from the wireless charger device.

The wireless power transmission/reception module may be configured to receive, from the wireless charger device, power bypassing an external device of which a coil and a wireless power transmission/reception circuit are disconnected, while the electronic device is being charged by the wireless charger device.

The processor may be configured to store, in response to the electronic device receiving the charging signal, status information of an application being executed at a time when the charging signal is received and suspend the application.

The processor may be configured to load, in response to charging the electronic device being terminated, status information stored at a time when the charging is started.

The wireless power transmission/reception module may be configured to in a case where toggle charging is set, repeat an operation of suspending power reception from the wireless charger device while a coil of the external device is activated and an operation of resuming power reception from the wireless charger device while the coil of the external device is deactivated until charging the electronic device is terminated after charging the electronic device is started by receiving the charging signal, and in a case where non-toggle charging is set, continue power reception from the wireless charger device until charging the electronic device is terminated after charging the electronic device is started by receiving the charging signal.

The communication module may be configured to receive, from the external device, power transmission-related information comprising at least one or a combination of two or more of a battery state identifier, operation identification information indicating an operation executed by the external device, required power information, a power transmission efficiency, or remaining battery power of the external device, and the processor may be configured to determine an amount of power to be transmitted to the external device based on the received power transmission-related information.

The processor may be configured to determine an operation to be executed with respect to the external device in an application, and transmit operation identification information indicating the determined operation to the external device through the communication module.

The processor may be configured to supply at least a portion of the power received from the external device to an element in the electronic device not through the battery, in response to remaining battery power of the electronic device lacking and a direct transfer path between the wireless power transmission/reception module and another module, comprising circuitry, in the electronic device being activated, while charging by the wireless charger device is not detected.

The processor may be configured to adjust an amount of power to be transmitted to the external device by controlling a power transmission duty ratio of the wireless power transmission/reception module based on power transmission-related information.

The processor may be configured to control the wireless power transmission/reception module to transmit a first amount of power to the external device, in response to at least one of a case where a battery is absent from the external device or a case where remaining battery power of the external device lacks, and when the external device has a battery, reduce an amount of power to a second amount of power that is less than the first amount of power as the battery of the external device is charged.

According to an example embodiment, an electronic device includes a processor, a memory electrically connected, directly or indirectly, to the processor, a wireless power transmission/reception module configured to perform wireless power transfer with an external device, and a communication module configured to establish communication with the external device, wherein the processor may be configured to deactivate power reception of the wireless power transmission/reception module in response to charging identification information indicating a start of charging the external device being received from the external device disposed on an opposite side of a wireless charger device based on the electronic device, and power provided from the wireless charger device may be transmitted to the external device by bypassing the electronic device after power reception of the electronic device is deactivated.

The processor may be configured to disconnect a coil and a wireless power transmission/reception circuit included in the wireless power transmission/reception module to isolate the coil from the wireless power transmission/reception circuit, while the external device is being charged by the wireless charger device.

The processor may be configured to, in response to charging identification information indicating a start of charging the external device being received, deactivate one or more elements corresponding to an operation being executed by an application at a time when the charging identification information is received.

The processor may be configured to store status information of the application being executed at the time when the charging identification information is received in the memory, and in response to charging the external device being terminated, load status information stored at a time when charging the external device is started and resuming the operation related to the application.

The processor may be configured to, in a case where toggle charging is set, repeat an operation of connecting a coil of the electronic device to a wireless power transmission/reception circuit and an operation of disconnecting the coil from the wireless power transmission/reception circuit until charging the external device is terminated after charging the external device is started by receiving the charging signal, and in a case where non-toggle charging is set, maintain the coil to be disconnected from the wireless power transmission/reception circuit.

The communication module may be configured to transmit, to the external device, power transmission-related information comprising at least one or a combination of two or more of a battery state identifier of the electronic device, operation identification information indicating an operation executed by the electronic device, required power information, a power transmission efficiency, or remaining battery power of the electronic device.

The processor may be configured to activate an element corresponding to at least one of an operation triggered in response to execution of an application and an operation indicated by operation identification information received from the external device.

The processor may be configured to supply at least a portion of the power received from the external device to an element in the electronic device not through the battery, in response to remaining battery power of the electronic device lacking and a direct transfer path between the wireless power transmission/reception module and another module in the electronic device being activated, while charging the external device by the wireless charger device is not detected.

The processor may be configured to determine whether remaining battery power of the electronic device lacks based on a comparison between an expected power consumption required to activate an element corresponding to an operation executed by the electronic device and the remaining battery power of the electronic device.

The processor may be configured to suspend power reception from the external device in response to at least one of a case where an external power source is connected, directly or indirectly, to the electronic device and a case where remaining battery power is greater than or equal to a threshold.

According to an example embodiment, an electronic device may improve wireless power transmission efficiency and charging speed by receiving, from a wireless charger device, power bypassing an external device of which a wireless power transmission/reception module is deactivated.

According to an example embodiment, an electronic device may wirelessly transmit a larger amount of power to an external device from which a battery is absent or of which remaining battery power lacks.

According to an example embodiment, when a battery is absent from an electronic device or remaining battery power of the electronic device lacks, the electronic device may improve power efficiency by using power received from an external device, not through the battery.

According to an example embodiment, an electronic device may dynamically and efficiently transmit and receive power in consideration of a battery state of the electronic device and a battery state of an external device.

BRIEF DESCRIPTION OF DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
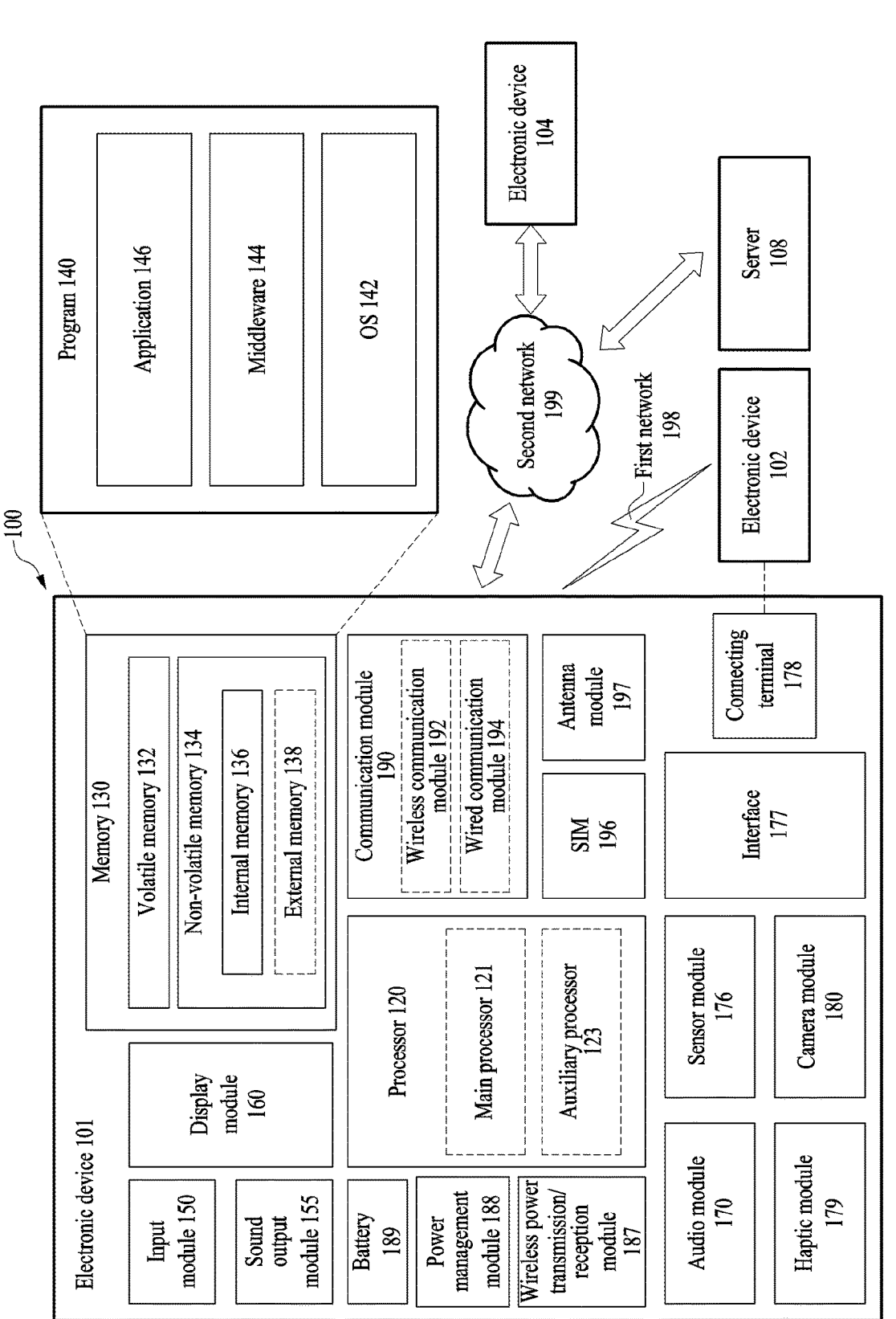
FIG. 1 is a block diagram illustrating a configuration of an electronic device in a network environment according to an example embodiment.

Hereinafter, example embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a wireless power transmission/reception module 187, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected, directly or indirectly, to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The wireless power transmission/reception module 187 may perform wireless power transfer. Wireless power transfer may include wireless power transmission and wireless power reception. The wireless power transmission/reception module 187 may transmit wireless power to an external device or receive wireless power from the external device. The wireless power transmission/reception module 187 may receive wireless power from a wireless charger device. Power charged in the battery 189, which will be described below, may be wirelessly transmitted through the wireless power transmission/reception module 187, or received power may be charged in the battery 189. The wireless power transmission/reception module 187 will be described in detail below with reference to FIG. 3.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network.

According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
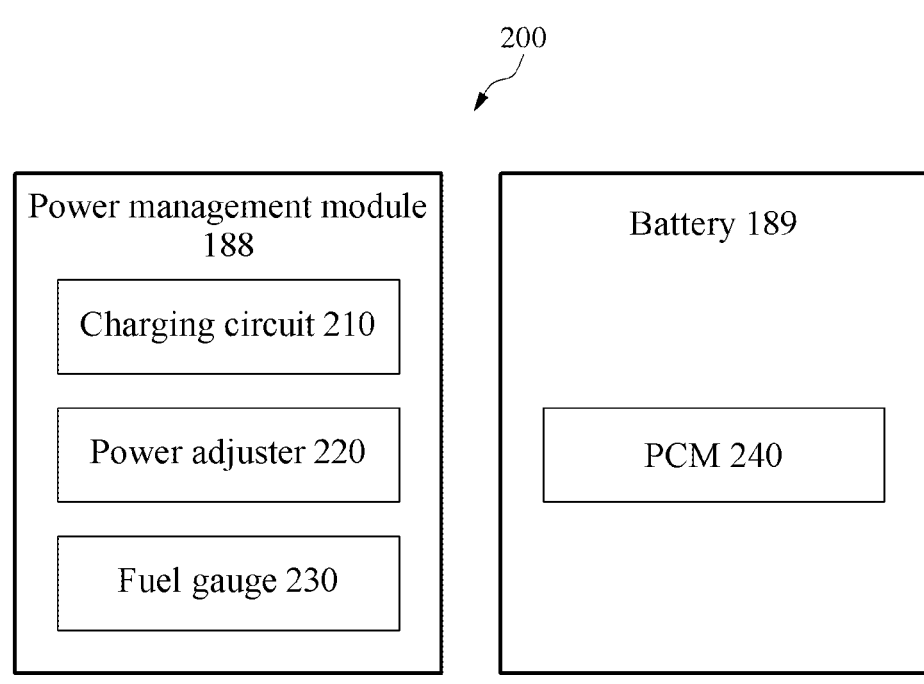
FIG. 2 is a block diagram of a power management module and a battery according to an example embodiment.

FIG. 2 is a block diagram 200 illustrating the power management module 188 and the battery 189 according to an embodiment. Referring to FIG. 2, the power management module 188 may include a charging circuit 210, a power adjuster 220, or a fuel gauge 230. The charging circuit 210 may charge the battery 189 using power supplied from an external power source outside the electronic device 101. According to an embodiment, the charging circuit 210 may select a charging scheme (e.g., normal charging or quick charging) based at least in part on a type of the external power source (e.g., a power outlet, a USB, or wireless charging), a magnitude of power suppliable from the external power source (e.g., about 20 Watts or more), or an attribute of the battery 189, and may charge the battery 189 using the selected charging scheme. The external power source may be connected, directly or indirectly, with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low-dropout (LDO) regulator or a switching regulator. The fuel gauge 230 may measure use state information about the battery 189 (e.g., a capacity, a number of times of charging or discharging, a voltage, or a temperature of the battery 189).

The power management module 188 may determine, using, for example, the charging circuit 210, the power adjuster 220, or the fuel gauge 230, charging state information (e.g., lifetime, over voltage, low voltage, over current, over charge, over discharge, overheat, short, or swelling) related to charging the battery 189 based at least in part on the measured use state information about the battery 189. The power management module 188 may determine whether the state of the battery 189 is normal or abnormal based at least in part on the determined charging state information. If the state of the battery 189 is determined to be abnormal, the power management module 188 may adjust charging the battery 189 (e.g., reduce the charging current or voltage, or stop the charging). According to an embodiment, at least some of the functions of the power management module 188 may be performed by an external control device (e.g., the processor 120)

According to an embodiment, the battery 189 may include a protection circuit module (PCM) 240. The PCM 240 may perform one or more of various functions (e.g., a pre-cutoff function) to prevent or reduce performance deterioration of, or damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 276, the fuel gauge 230, or the power management module 188. According to an embodiment, the corresponding sensor (e.g., the temperature sensor) of the sensor module 176 may be included as part of the PCM 140, or may be disposed near the battery 189 as a separate device. The electronic device according to the embodiments disclosed herein may be one of various types of electronic devices. The electronic device may include, for example, a portable communication device (e.g., a smart phone), a computer device, a portable multimedia device, a portable medical device, a camera, a wearable device, or a home appliance device. According to an example embodiment, the electronic device is not limited to those described above.

It should be understood that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an example embodiment may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 3:
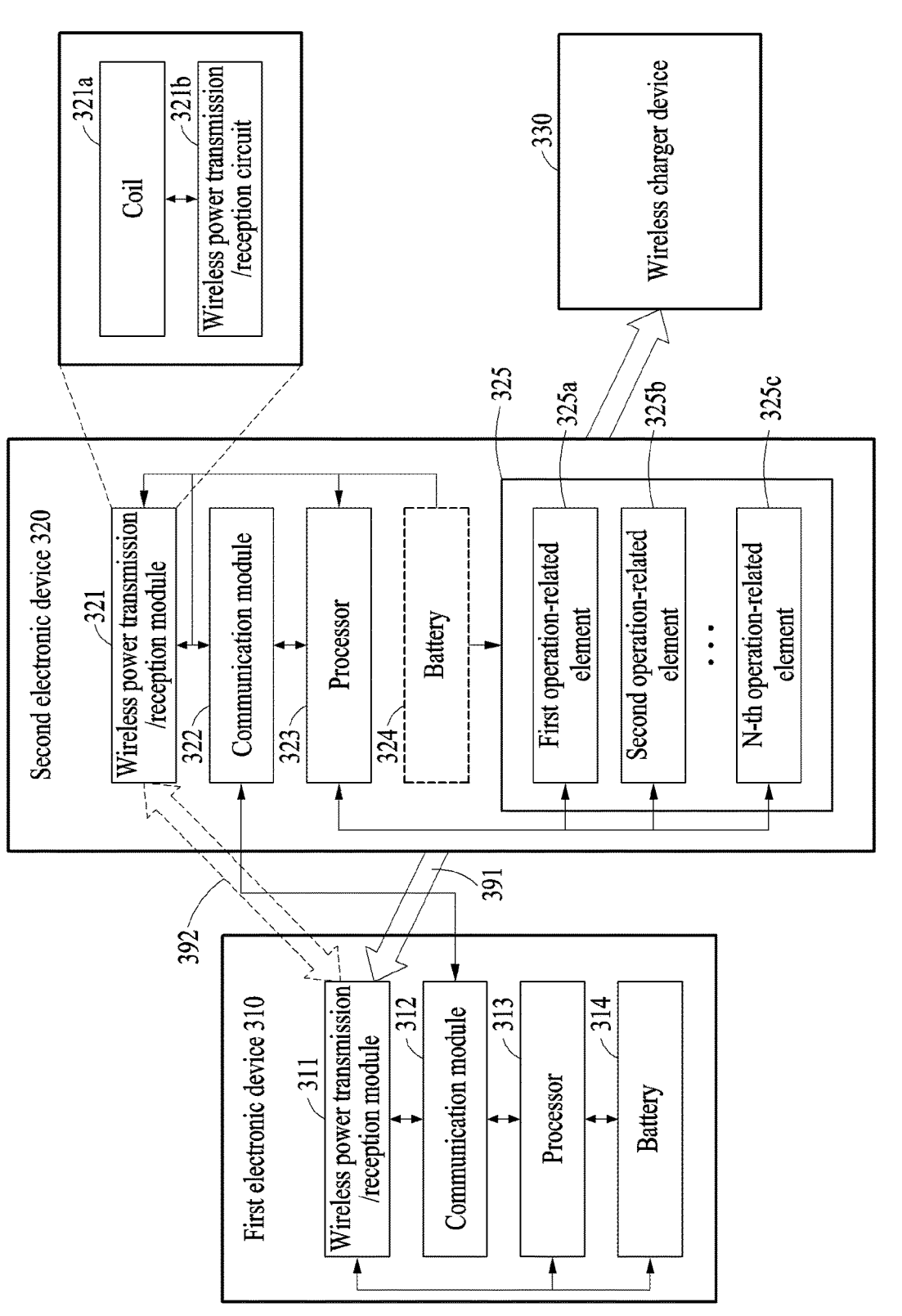
FIG. 3 is a diagram illustrating a wireless power transfer system according to an example embodiment.

FIG. 3 is a diagram illustrating a wireless power transfer system according to an embodiment.

A wireless power transfer system may include a first electronic device 310 (e.g., the electronic device 101 of FIG. 1), a second electronic device 320 (e.g., the electronic device 102 of FIG. 1), and a wireless charger device 330. For reference, an example of the first electronic device 310 being a master device and the second electronic device 320 being a slave device will be mainly described herein. The master device may be a device that controls a function and/or an operation of the slave device, and the slave device may be a device that operates under the control of the master device. For example, in response to an operation of an application executed in the master device, an element corresponding to the operation may be activated in the slave device. However, embodiments are not limited thereto. Unless otherwise described, the operation of the first electronic device 310 and the operation of the second electronic device 320 may be replaced with each other, so that the first electronic device 310 may operate as a slave device, and the second electronic device 320 may operate as a master device. In addition, it may be described that the second electronic device 320 may be an external device for the first electronic device 310 and the first electronic device 310 may be an external device for the second electronic device 320.

The first electronic device 310 may include a wireless power transmission/reception module 311 (e.g., the wireless power transmission/reception module 187 of FIG. 1), a communication module 312 (e.g., the communication module 190 of FIG. 1), a processor 313 (e.g., the processor 120 of FIG. 1), and a battery 314 (e.g., the battery 189 of FIG. 1).

The wireless power transmission/reception module 311 may perform wireless power transfer with at least one of the wireless charger device 330 and an external device (e.g., the second electronic device 320). When receiving power 391 from the wireless charger device 330, the wireless power transmission/reception module 311 may receive the power 391 bypassing the second electronic device 320. For example, a coil of the wireless power transmission/reception module 311 may be magnetically or inductively coupled with a coil of the wireless charger device 330. The wireless power transmission/reception module 311 may transmit wireless power 392 to the second electronic device 320 or receive wireless power 392 from the second electronic device 320. For example, the coil of the wireless power transmission/reception module 311 may be magnetically or inductively coupled with a coil 321a of a wireless power transmission/reception module 321 of the second electronic device 320.

The communication module 312 may establish communication with the external device (e.g., the second electronic device 320). Although FIG. 3 illustrates the communication module 312 and the wireless power transmission/reception module 311 separately, embodiments are not limited thereto, and the communication module 312 and the wireless power transmission/reception module 311 may be implemented to be integrated into a wireless communication module 312 (e.g., the wireless communication module 192 of FIG. 1).

In response to a charging signal from the wireless charger device 330 being detected, the processor 313 may transmit charging identification information indicating a start of charging the first electronic device 310 to the external device (e.g., the second electronic device 320) through the communication module 312. For example, in response to the charging signal being detected, the processor 313 may transmit an instruction to deactivate power reception of the second electronic device 320 to the second electronic device 320 through the communication module 312. The processor 313 may receive power provided from the wireless charger device 330 through the wireless power transmission/reception module 311 by bypassing the second electronic device 320 after the power reception of the second electronic device 320 is deactivated. The processor 313 may charge the battery 314 using the power received from the wireless charger device 330.

Further, the processor 313 may control the wireless power transmission/reception module 311 based on power transmission-related information received from the second electronic device 320. The power transmission-related information may include, for example, a battery state identifier of the second electronic device 320, operation identification information indicating an operation executed by the second electronic device 320, required power information, a power transmission efficiency, or remaining battery power of the second electronic device 320. The battery state identifier may be an identifier indicating a battery state of the second electronic device 320, and may indicate one of a state in which the battery 314 is absent, a state in which the remaining battery power lacks, and a state in which the remaining battery power suffices, for example. The state in which the battery 314 is absent may include a state in which the battery 314 is missing and a state in which the battery 314 is removed. The state in which the remaining battery power lacks may be a state in which the remaining battery power is less than a threshold. The state in which the remaining battery power is sufficient may be a state in which the remaining battery power is greater than or equal to the threshold. Here, the threshold may be a value determined based on an expected power consumption for one or more operations executed by an application. The operation identification information may include an identifier indicating an operation executed or triggered to be executed by an application among a plurality of operations executable in the second electronic device 320. The required power information may include information about an amount of power to be transmitted to execute an operation according to the operation identification information. The power transmission efficiency may indicate a ratio of received power to transmitted power between the first electronic device 310 and the second electronic device 320.

The processor 313 may monitor whether a direct transfer path of power between the wireless power transmission/reception module 311 and another module is activated, whether the first electronic device 310 is charged, an operation activated in the second electronic device 320, whether the first electronic device 310 is in sleep mode, and whether the second electronic device 320 is in sleep mode. The direct transfer path may be a path through which power received from the outside is supplied to a module and/or an element in the first electronic device 310 not through the battery 314. The above-described monitoring operation for status management is not limited to being performed by the processor 313, and may be performed by another hardware module that is different from the processor 313.

The battery 314 may be charged with power received from the wireless charger device 330.

The second electronic device 320 may include the wireless power transmission/reception module 321, a communication module 322, a processor 323, and operation-related elements 325. The second electronic device 320 may include a battery 324, or the battery 324 may be removed from the second electronic device 320, or the battery 324 may be absent from the second electronic device 320. The second electronic device 320 from which the battery 324 is absent may be driven only by external power (e.g., power supplied from the first electronic device 310 or power from an external power source), which will be described later.

The wireless power transmission/reception module 321 may perform wireless power transfer with an external device (e.g., the first electronic device 310). The wireless power transmission/reception module 321 may perform wireless power transfer using at least one or a combination of two or more of a magnetic induction method, a magnetic resonance method, or an electromagnetic method. The wireless power transmission/reception module 321 may include the coil 321a and a wireless power transmission/reception circuit 321b. The wireless power transmission/reception circuit 321b connected, directly or indirectly, to the coil 321a may operate as a wireless transmission circuit or a wireless reception circuit. The wireless power transmission/reception circuit 321b may be implemented, for example, by a method defined in the Qi standard. According to an embodiment, electronic devices may transmit a battery state identifier, settings of the wireless power transmission/reception circuit 321b according to a battery state, and enable information indicating lack of battery, which will be described later in a communication protocol according to the Qi standard. However, the transmission of the above-described information is not limited to the Qi protocol, and may be performed by separate Bluetooth low energy (BLE) communication. The wireless power transmission/reception circuit 321b may include a power conversion unit and a power pick-up unit. The wireless power transmission/reception circuit 321b may include a switch for switching between a wireless power transmission operation and a wireless power reception operation according to mode settings. The wireless power transmission/reception circuit 321b may transmit or receive power by a resonance method. For example, in the case of the resonance method, a wireless power transmission/reception device may include a power source, a direct current (DC)-alternating current (AC) conversion circuit, an amplification circuit, an impedance matching circuit, at least one capacitor, at least one coil 321a, an out-band communication circuit (e.g., a Bluetooth low energy (BLE) communication circuit), and a rectification circuit. The at least one capacitor and the at least one coil 321a may form a resonator. However, the implementation of the wireless power transmission/reception circuit 321b is not limited thereto, and the wireless power transmission/reception circuit 321b may also be implemented by a method defined in the wireless power consortium (WPC) standard, the Alliance for Wireless Power (A4WP) standard, the air fuel alliance (AFA) standard, or the Power Matters Alliance (PMA) standard. In addition, the coil 321a is not limited to the above description, and the coil 321a may be implemented as a power transmission/reception antenna.

For reference, the wireless power transmission/reception module 311 of the first electronic device 310 may also be implemented in the same or similar manner as the wireless power transmission/reception module 321.

The communication module 322 may establish communication with the external device (e.g., the first electronic device 310).

The processor 323 may deactivate power reception of the wireless power transmission/reception module 321, in response to charging identification information indicating a start of charging the external device (e.g., the first electronic device 310), disposed on an opposite side of the wireless charger device 330 based on the second electronic device 320, being received from the external device. The power provided from the wireless charger device 330 may be transmitted to the external device by bypassing the second electronic device 320 after the power reception of the second electronic device 320 is deactivated.

In addition, the processor 323 may set whether to activate a direct transfer path of power between the wireless power transmission/reception module 321 and another module. The processor 323 may transmit the power transmission-related information including the battery state identifier, the operation identification information, the required power information, the power transmission efficiency, and the remaining battery power of the second electronic device 320 to the first electronic device 310 through the communication module 322.

The processor 323 may monitor whether a battery is present or absent and the remaining battery power of the second electronic device 320. The processor 323 may calculate the power transmission efficiency and the required power information. The processor 323 may sense and record the amount of power received. The processor 323 may determine whether the power received from the first electronic device 310 is undersupplied or oversupplied. The above-described monitoring operation for status management is not limited to being performed by the processor 323, and may be performed by another hardware module that is different from the processor 323.

The battery 324 may store the power received from the first electronic device 310. The power stored in the battery 324 may be used to drive the other elements and/or modules in the second electronic device 320.

The operation-related elements 325 may be elements related to an operation of an application executed in the first electronic device 310. For example, the operation-related elements may include a first operation-related element 325a and a second operation-related element 325b through an N-th operation-related element 325c. Here, N may be an integer greater than or equal to "2". The operation of the application may include, for example, a display expansion operation, bio-sensing, light emitting diode (LED) display driving, and a face tracking operation. The display expansion operation may be an operation of driving an additional display (e.g., an additional display 1529 of FIG. 15) of the second electronic device 320 in interoperation with a display (e.g., the display module 160 of FIG. 1) of the first electronic device 310. An element related to the display expansion operation may be the additional display (e.g., the additional display 1529 of FIG. 15). Bio-sensing may be an operation of sensing biometric information of a user. An element related to bio-sensing may be a biometric sensor (e.g., a biometric sensor 1629 of FIG. 16). The biometric sensor (e.g., the biometric sensor 1629 of FIG. 16) may include, for example, a blood pressure sensor and a body temperature sensor, and the biometric information may include, for example, blood pressure information and body temperature information. LED display driving may be an operation of driving an auxiliary LED display (e.g., an auxiliary display 1628 of FIG. 16) of the second electronic device 320 to display auxiliary information (e.g., visual information). An element related to LED display driving may be an LED display (e.g., the auxiliary display 1628 in FIG. 16). The face tracking operation may be an operation, performed by the second electronic device 320 gripping the first electronic device 310, of targeting a camera of the first electronic device 310 at a face of a target person by rotating the first electronic device 310. An element related to the face tracking operation may be a motor (not shown) for the rotation described above.

The wireless charger device 330 may be a device that transmits power to charge the first electronic device 310. The wireless charger device 330 may include a coil to be magnetically or inductively coupled with the coil 321a of the wireless power transmission/reception module 321 of the first electronic device 310.

Hereinafter, charging the first electronic device 310 by the wireless charger device 330 will be described with reference to FIGS. 4 to 9, and the dynamic wireless power transfer between the first electronic device 310 and the second electronic device 320 will be described with reference to FIGS. 10 to 17.

Figure 4:
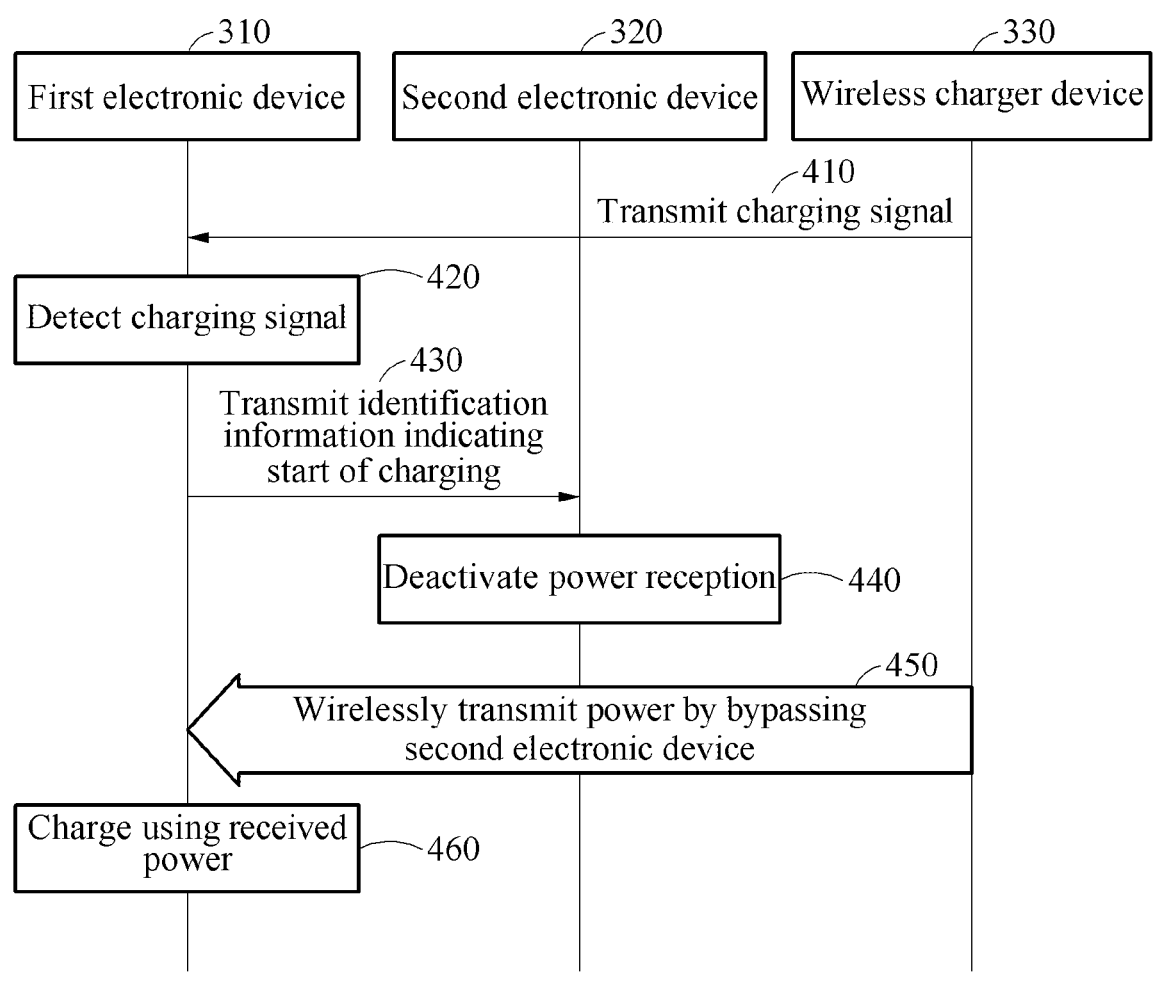
FIG. 4 is a flowchart illustrating charging a first electronic device according to an example embodiment.

FIG. 4 is a flowchart illustrating charging a first electronic device according to an embodiment.

In the following embodiments, operations may be performed sequentially, but are not necessarily performed sequentially. For example, the operations may be performed in different orders, and at least two of the operations may be performed in parallel.

In operation 410, the wireless charger device 330 may transmit a charging signal to the first electronic device 310. When the first electronic device 310 approaches the wireless charger device 330 and is within a threshold distance therefrom, the wireless charger device 330 may detect the existence of the first electronic device 310. The wireless charger device 330 may transmit a charging signal to the first electronic device 310 that approaches the wireless charger device 330 and is within the threshold distance therefrom.

In operation 420, the first electronic device 310 may detect the charging signal transmitted from the wireless charger device 330. For example, the first electronic device 310 may detect the charging signal according to the Qi protocol. In response to detecting the charging signal, the first electronic device 310 may activate a wireless power reception circuit within a wireless power transmission/reception module. For example, the first electronic device 310 may select the wireless power reception circuit through switching.

In operation 430, the first electronic device 310 may transmit charging identification information indicating a start of charging to the second electronic device 320. The charging identification information may include an identifier indicating whether the first electronic device 310 is charged by the wireless charger device 330. Further, the first electronic device 310 may transmit an instruction to deactivate an element corresponding to an operation executed in a current application to the second electronic device 320.

In operation 440, the second electronic device 320 may deactivate power reception. For example, while the first electronic device 310 is being charged by the wireless charger device 330, the processor of the second electronic device 320 may disconnect the coil and the wireless power transmission/reception circuit included in the wireless power transmission/reception module of the second electronic device 320. The second electronic device 320 may disconnect the coil and the wireless power transmission/reception circuit, thereby isolating the coil from the wireless power transmission/reception circuit. The isolated coil of the second electronic device 320 may not interfere with wireless power transfer between the first electronic device 310 and the wireless charger device 330. Additionally, the second electronic device 320 may deactivate an element corresponding to the operation executed in the application.

In operation 450, the wireless charger device 330 may wirelessly transmit power to the first electronic device 310 by bypassing the second electronic device 320. For example, the wireless power transmission/reception module of the first electronic device 310 may receive, from the wireless charger device 330, power bypassing an external device of which a coil and a wireless power transmission/reception circuit are disconnected, while the electronic device is being charged by the wireless charger device 330.

In operation 460, the wireless charger device 330 may perform charging using the received power. The wireless charger device 330 may charge the battery.

Figure 5:
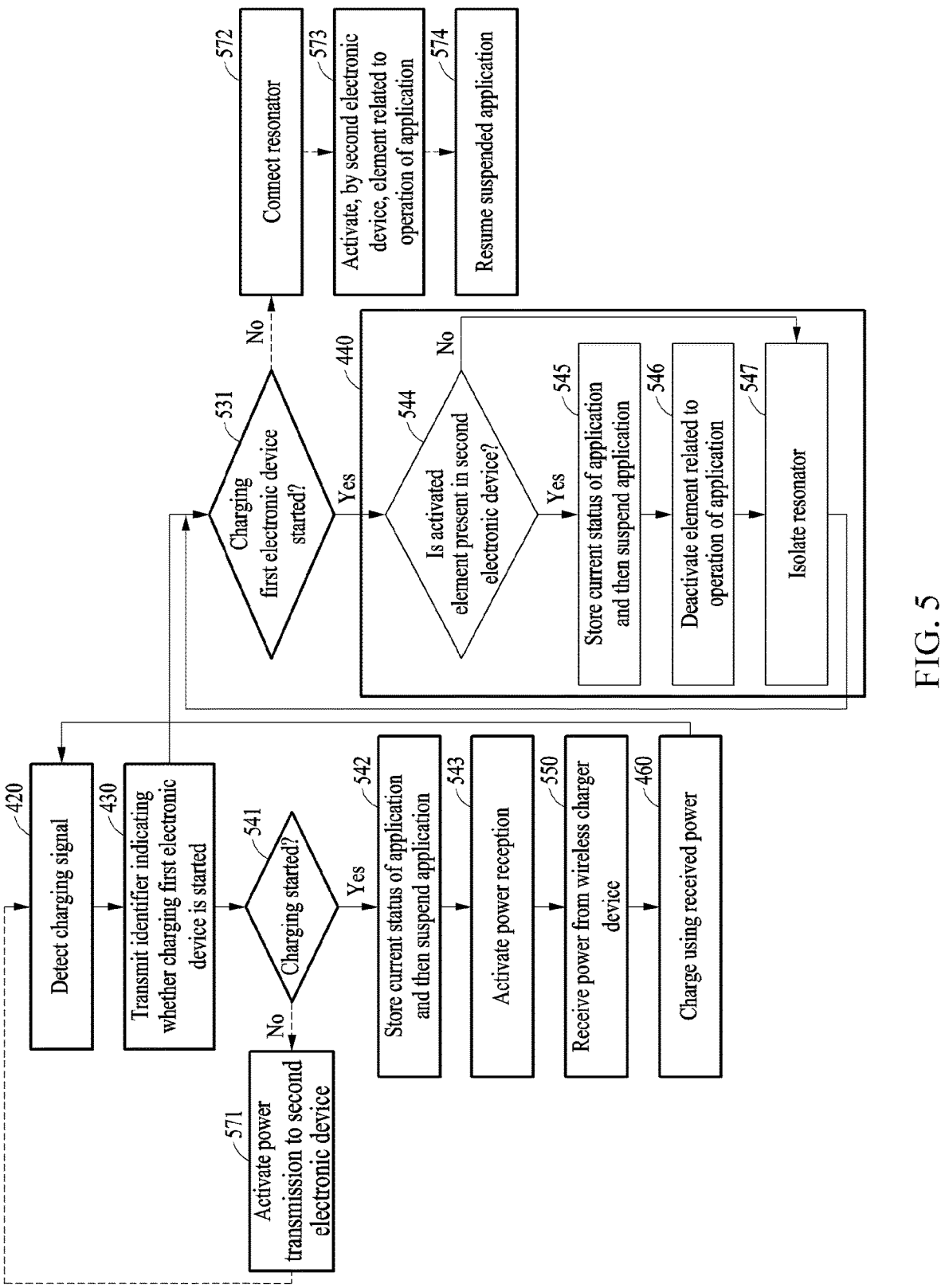
FIG. 5 is a flowchart illustrating charging and wireless power transfer of a first electronic device according to an example embodiment.

FIG. 5 is a flowchart illustrating charging and wireless power transfer of a first electronic device according to an embodiment.

In the following embodiments, operations may be performed sequentially, but are not necessarily performed sequentially. For example, the operations may be performed in different orders, and at least two of the operations may be performed in parallel.

As described above, the first electronic device may detect a charging signal in operation 420, and transmit an identifier indicating whether charging the first electronic device is started to the second electronic device in operation 430.

In operation 541, the first electronic device may determine whether charging is started. The first electronic device may determine to charge when reception of a charging signal from a wireless charger device is detected.

In operation 571, the first electronic device may activate power transmission to the second electronic device when reception of a charging signal is not detected. For example, the first electronic device may select and activate a wireless power transmission circuit in a wireless power transmission/reception module. When the first electronic device is connected to the second electronic device within a threshold distance, the first electronic device may determine whether to perform wireless power transmission according to a battery state of the second electronic device. The first electronic device may repeat operations 420, 430, 541, and 571 until a charging signal is detected.

In operation 542, the first electronic device may store a current status of an application and then suspend the application. According to an embodiment, in response to the first electronic device receiving a charging signal, a processor of the first electronic device may store status information of an application being executed at a time when the charging signal is received and suspend the application. For example, the first electronic device may store the status information at the time when the charging signal is received in a random-access memory (RAM). The status information of the application may include an operation being executed by the application, an element related to each operation, and a graphic object displayed through a display.

In operation 543, the first electronic device may activate power reception. For example, the first electronic device may select and activate a wireless power reception circuit in the wireless power transmission/reception module.

In operation 550, the first electronic device may receive power from the wireless charger device. The first electronic device may receive, from the wireless charger device, power bypassing the second electronic device of which power reception is deactivated.

In operation 460, the first electronic device may charge a battery using the received power.

The first electronic device may repeat operations 420, 430, 541, 542, 543, 550, and 460 described above, while the charging signal is detected. The first electronic device may load, in response to charging the electronic device being terminated, status information stored at a time when the charging is started. The termination of charging may indicate that the first electronic device moves away from the wireless charger device more than the threshold distance or that charging is completed as the battery of the first electronic device is fully charged.

In operation 531, the second electronic device may determine whether charging the first electronic device is started. The second electronic device may determine whether charging the first electronic device is started based on charging identification information received from the first electronic device. The second electronic device may determine that charging the first electronic device is in progress when the charging identification information includes an identifier indicating that the first electronic device is being charged. The second electronic device may determine that charging the first electronic device is terminated when the charging identification information includes an identifier indicating that charging the first electronic device is terminated.

When charging the first electronic device is started, the second electronic device may determine whether an activated element is present in the second electronic device in operation 544. When an activated element is absent, the second electronic device may immediately isolate a coil in operation 547.

In operation 545, when an activated element is present, the second electronic device may store a current status of an application and then suspend the application. For example, the second electronic device may store status information of an application being executed at a time when the charging identification information is received in a memory (e.g., RAM).

In operation 546, the second electronic device may deactivate an element related to an operation of the application. For example, in response to charging identification information indicating a start of charging the external device being received, a processor of the second electronic device may deactivate one or more elements corresponding to an operation being executed by the application at the time when the charging identification information is received.

In operation 547, the second electronic device may isolate the coil. The second electronic device may disconnect the coil from a wireless power transmission/reception circuit and deactivate the entire wireless power transmission/reception module. While the coil of the second electronic device is isolated, the first electronic device may receive power from the wireless charger device without interference from the second electronic device in operation 550 described above.

While the first electronic device detects a charging signal, the second electronic device may repeat operations 531, 544, 545, 546, and 547 described above.

In operation 572, when the first electronic device does not detect a charging signal, the second electronic device may connect the coil. For example, the second electronic device may connect the coil to the wireless power transmission/reception circuit. Further, the second electronic device may activate the wireless power transmission/reception module. The second electronic device may select and activate a wireless power reception circuit in the wireless power transmission/reception circuit while connecting the coil to the wireless power transmission/reception circuit. However, embodiments are not limited thereto, and the second electronic device may select and activate a wireless power transmission circuit according to a battery state of the first electronic device and a battery state of the second electronic device.

In operation 573, the second electronic device may activate an element related to the operation of the application. In operation 574, in response to charging the first electronic device being terminated, the second electronic device may load status information stored at a time when charging the first electronic device is started and resume the operation related to the application. According to an embodiment, even when an application is suspended for charging the first electronic device, the first electronic device and the second electronic device may restore the application to a status at a time when the application is suspended without delay as soon as the charging is terminated. While the first electronic device does not detect a charging signal, the second electronic device may maintain the execution of the application.

Figure 6:
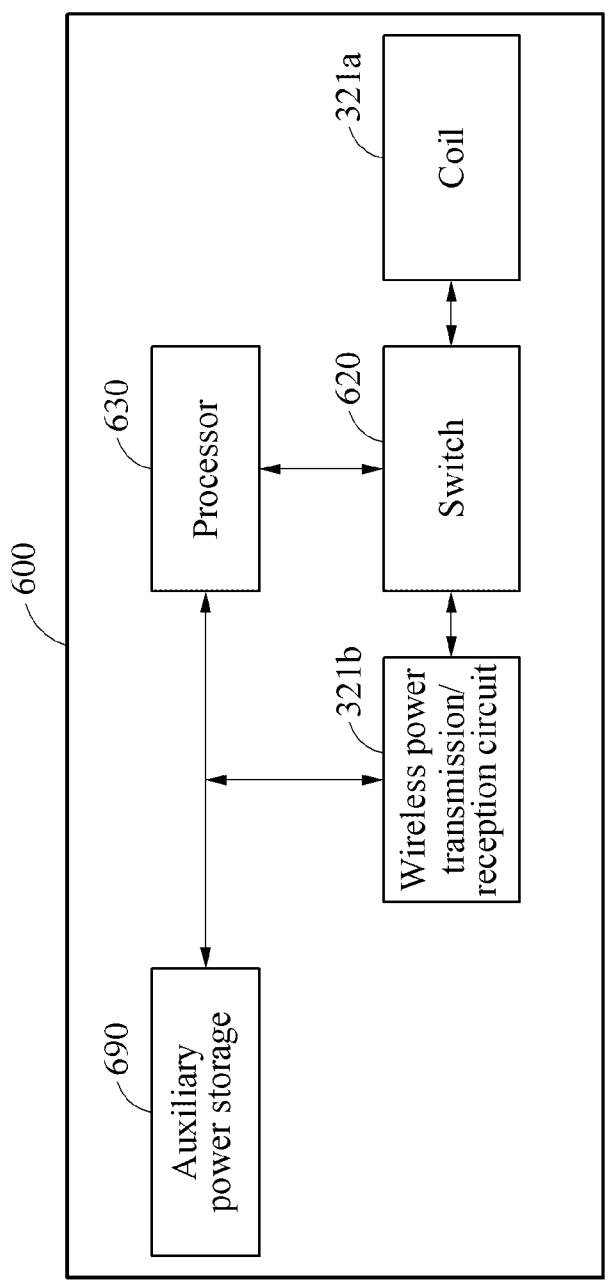
FIG. 6 is a block diagram illustrating an exemplary configuration of a second electronic device according to an example embodiment.

FIG. 6 is a block diagram illustrating an exemplary configuration of a second electronic device according to an embodiment.

A second electronic device 600 (e.g., the second electronic device 320 of FIG. 3) may include a coil 321a, a switch 620, a wireless power transmission/reception circuit 321b, a processor 630, and an auxiliary power storage 690. Since the operation of the coil 321a and the operation of the wireless power transmission/reception circuit 321b have been described above, a detailed description thereof will be omitted.

The switch 620 may switch a connection between the wireless power transmission/reception circuit 321b and the coil 321a. For example, the switch 620 may connect the coil 321a and the wireless power transmission/reception circuit

321b or disconnect the coil 321a and the wireless power transmission/reception circuit 321b under the control of the processor 630. The coil 321a disconnected from the wireless power transmission/reception circuit 321b may be isolated.

Figure 7:
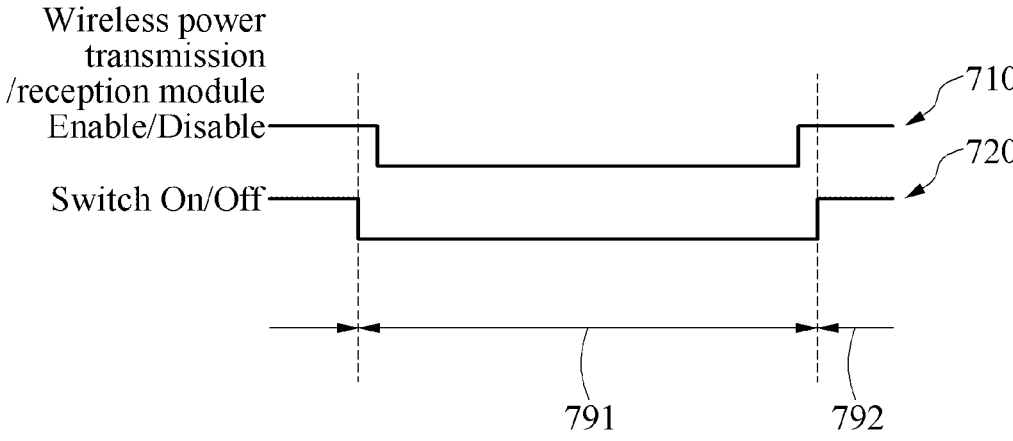
FIGS. 7 and 8 illustrate flowcharts of managing power of a second electronic device having an auxiliary power storage while charging a first electronic device according to an example embodiment.

The auxiliary power storage 690 may be a power storage different from a battery (e.g., the battery 324 of FIG. 3) of the second electronic device 600. While a first electronic device (e.g., the first electronic device 310 of FIG. 3) is being charged by a wireless charger device (e.g., the wireless charger device 330 of FIG. 3), the coil 321a may be isolated, so that wireless power supply to the second electronic device 600 may be blocked. The auxiliary power storage 690 may temporarily store power during a designated period of time between periods in which the first electronic device is charged by the wireless charger device. The auxiliary power storage 690 may operate the processor 630 of the second electronic device 600 using the temporarily stored power. The processor 630 of the second electronic device 600 may generate and share power transmission-related information of the second electronic device 600 while the first electronic device is being charged by the wireless charger device using the power supplied by the auxiliary power storage 690. The auxiliary power storage 690 may include a power capacitor or a small-sized rechargeable battery. FIG. 7 below illustrates a timing diagram when the auxiliary power storage 690 includes a small-sized rechargeable battery, and FIG. 8 below shows a timing diagram when the auxiliary power storage 690 is a power capacitor.

Figure 8:
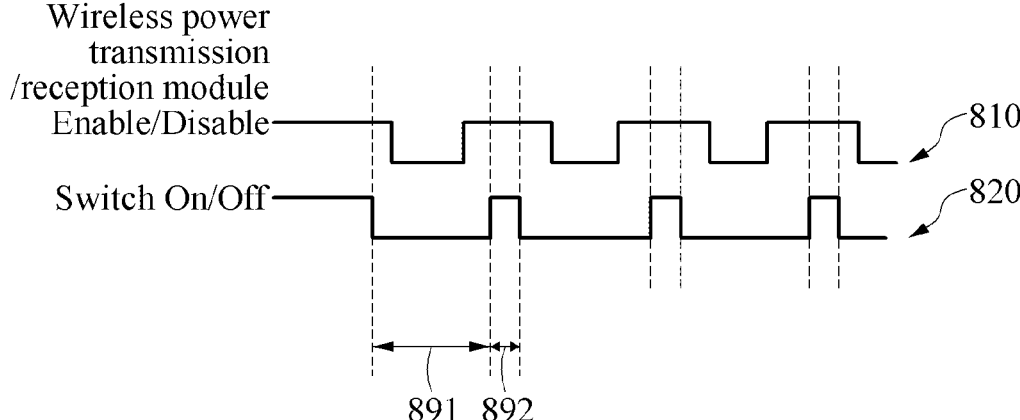

FIGS. 7 and 8 illustrate flowcharts of managing power of a second electronic device having an auxiliary power storage while charging a first electronic device according to an embodiment.

In the following embodiments, operations may be performed sequentially, but are not necessarily performed sequentially. For example, the operations may be performed in different orders, and at least two of the operations may be performed in parallel.

FIGS. 7 and 8 illustrate timing diagrams of enable signals 710 and 810 for a wireless power transmission/reception circuit (e.g., the wireless power transmission/reception circuit 321b of FIG. 3) and switching signals 720 and 820 applied to a switch (e.g., the switch 620 of FIG. 6). The enable signals 710 and 810 may be signals indicating whether to activate the wireless power transmission/reception circuit, and the switching signals 720 and 820 may be signals indicating whether a coil and a wireless power transmission/reception circuit are connected, directly or indirectly. When the enable signals 710 and 810 have a logic value of "H" (e.g., Enable), the wireless power transmission/reception circuit may be activated, and when the enable signals 710 and 810 have a logic value of "L" (e.g., Disable), the wireless power transmission/reception circuit may be deactivated. For example, when the enable signals 710 and 810 are "Enable", a processor of the second electronic device and the wireless power transmission/reception circuit may be electrically connected, directly or indirectly, and when the enable signals 710 and 810 are "Disable", the processor of the second electronic device and the wireless power transmission/reception circuit may be electrically disconnected. When the switching signals 720 and 820 have a logic value of "H" (e.g., On), the coil and the wireless power transmission/reception circuit may be connected, and when the switching signals 720 and 820 have a logic value of "L" (e.g., Off), the coil may be isolated.

FIG. 7 illustrates the enable signal 710 and the switching signal 720 in a case where non-toggle charging is set in the second electronic device. For example, an auxiliary power storage (e.g., the auxiliary power storage 690 of FIG. 6) may include a small-sized rechargeable battery. The small-sized rechargeable battery may have a capacity sufficient to operate a second electronic device (e.g., the second electronic device 320 of FIG. 3) until a battery of a first electronic device (e.g., the first electronic device 310 of FIG. 3) is fully charged. The second electronic device may disable a wireless power transmission/reception circuit and turn off a switch during a first period 791, so that the battery of the first electronic device may be charged by a wireless charger device. In the first period 791, turning off the switch may precede disabling the wireless power transmission/reception circuit, and enabling the wireless power transmission/reception circuit may precede turning on the switch. Charging the first electronic device may be maximized or high in the first period 791. After the battery of the first electronic device is fully charged, the second electronic device may enable the wireless power transmission/reception circuit and turn on the switch in a second period 792. During the second period 792, the auxiliary power storage of the second electronic device may be charged.

According to an embodiment, in a case where non-toggle charging is set, the processor of the second electronic device may maintain the coil to be disconnected from the wireless power transmission/reception circuit. In a case where non-toggle charging is set, a processor of the first electronic device may receive a charging signal and continue charging the first electronic device until charging the first electronic device is terminated after charging the first electronic device started. For example, in a case where non-toggle charging is set, the first electronic device may receive the charging signal and continue receiving power from the wireless charger device until charging the first electronic device is terminated after charging the first electronic device is started.

However, although an example in which the second electronic device having a small-sized rechargeable battery as an auxiliary power storage operates in non-toggle charging has been described in FIG. 7, embodiments are not limited thereto, and the second electronic device may also operate in toggle charging, which will be described in FIG. 8, by a design, a user input, or at least one or a combination of two or more of settings of an application.

FIG. 8 illustrates the enable signal 810 and the switching signal 820 in a case where toggle charging is set in the second electronic device. For example, the auxiliary power storage may include a power capacitor. The power capacitor may have a capacity insufficient to operate the second electronic device until the battery of the first electronic device is fully charged. The second electronic device may toggle between charging and discharging of the auxiliary power storage in the second electronic device until the battery of the first electronic device is fully charged.

For example, the second electronic device may disable the wireless power transmission/reception circuit and turn off the switch during a first period 891, so that the battery of the first electronic device may be charged. In the first period 891, turning off the switch may precede disabling the wireless power transmission/reception circuit, and enabling the wireless power transmission/reception circuit may precede turning on the switch. Charging the first electronic device may be maximized or high in the first period 891. After a time designated to the first period 891 elapses, the second electronic device may enable the wireless power transmission/reception circuit and turn on the switch in a second period 892. During the second period 892, the auxiliary power storage of the second electronic device may be charged. The second electronic device may repeat the first period 891 and the second period 892 until the battery of the first electronic device is fully charged.

According to an embodiment, in a case where toggle charging is set, a processor (e.g., the processor 323 of FIG. 3) of the second electronic device may repeat an operation of connecting the coil to the wireless power transmission/reception circuit of the second electronic device and an operation of disconnecting the coil from the wireless power transmission/reception circuit, until charging the first electronic device is terminated after charging the first electronic device is started by receiving the charging signal. In a case where toggle charging is set, a processor (e.g., the processor 313 of FIG. 3) of the first electronic device may repeat an operation of suspending charging the first electronic device while the coil of the second electronic device is activated and an operation of resuming charging the first electronic device while the coil of the second electronic device is deactivated, until charging the first electronic device is terminated after charging the first electronic device is started by receiving the charging signal. For example, in a case where toggle charging is set, a wireless power transmission/reception module of the first electronic device may repeat an operation of suspending power reception from the wireless charger device while the coil of the second electronic device is activated and an operation of resuming power reception from the wireless charger device while the coil of the second electronic device is deactivated, until charging the first electronic device is terminated after charging the first electronic device is started by receiving the charging signal.

Figure 9:
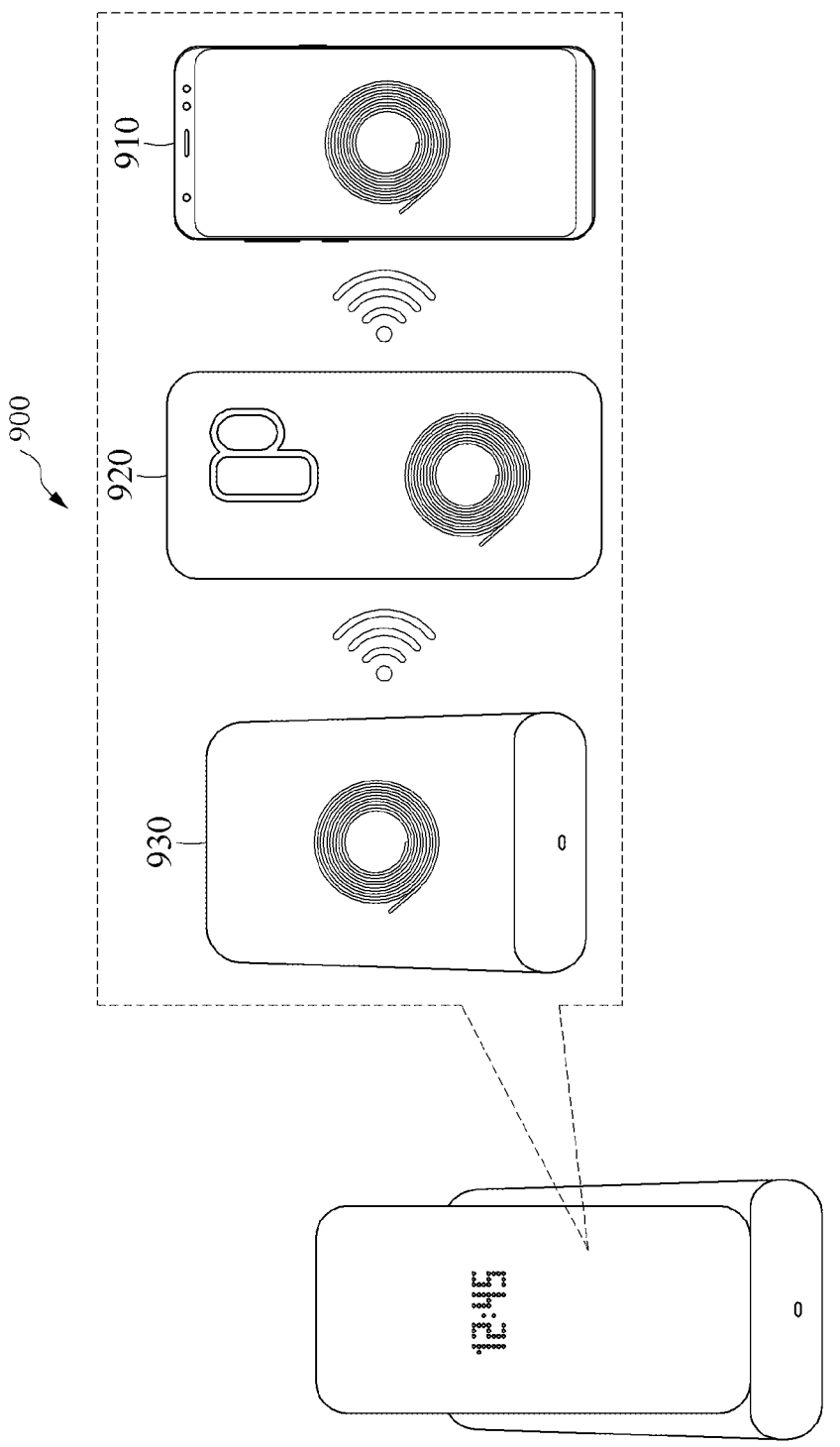
FIG. 9 illustrates an example of a first electronic device and a second electronic device according to an example embodiment.

FIG. 9 illustrates an example of a first electronic device and a second electronic device according to an embodiment.

In a wireless power transfer system 900, a first electronic device 910 (e.g., the first electronic device 310 of FIG. 3) may be a smart phone, and a second electronic device 920 (e.g., the second electronic device 320 of FIG. 3) may be a case device having a housing to be coupled with the first electronic device 910.

The second electronic device 920 may include, for example, a main body to be coupled to a first surface (e.g., a rear surface) of the first electronic device 910 and a cover part to cover a second surface (e.g., a front surface) of the first electronic device 910. The first surface may be a surface on which a main display (e.g., the display module 160 of FIG. 1) of the first electronic device 910 is disposed, and the second surface may be a surface opposite to the first surface. The main body of the second electronic device 920 may accommodate a wireless power transmission/reception module (e.g., the wireless power transmission/reception module 321 of FIG. 3), a communication module (e.g., the communication module 322 of FIG. 3), a processor (e.g., the processor 323 of FIG. 3), a battery (e.g., the battery 324 of FIG. 3), and operation-related elements (e.g., the operation-related elements 325 of FIG. 3). The cover part of the second electronic device 910 may accommodate a portion of the operation-related elements.

As shown in FIG. 9, when the first electronic device 910 is rested on a wireless charger device 930, the first surface of the first electronic device 910 may be a surface facing the wireless charger device. The second electronic device 920 coupled with the first electronic device 910 may be disposed between the first electronic device 910 and the wireless charger device 930. The second electronic device 920 may isolate a coil (e.g., the coil 321a of FIG. 3) from a wireless power transmission/reception circuit (e.g., the wireless power transmission/reception circuit 321b of FIG. 3), as described above with reference to FIGS. 4 to 8, thereby increasing the wireless power transmission efficiency between the first electronic device 910 and the wireless charger device 930.

Although the second electronic device 920 has been described in FIG. 9 as a case device having a fastening structure to be coupled to the first electronic device 910, embodiments are not limited thereto. The second electronic device 920 may be an auxiliary device having one or more elements for an operation related to an application executed by the first electronic device 910. Another example of the second electronic device 920 will be described below with reference to FIG. 17.

Figure 10:
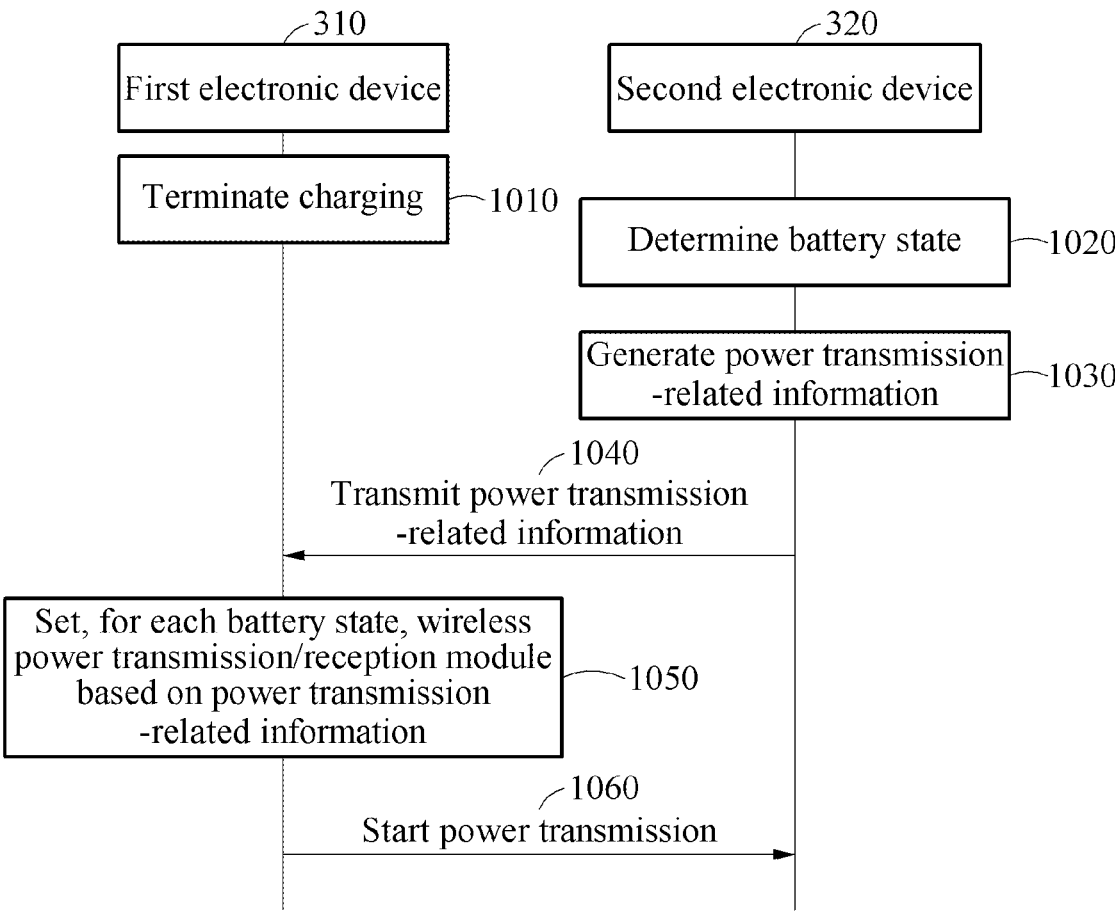
FIG. 10 is a flowchart illustrating a method of wireless power transfer between a first electronic device and a second electronic device schematically according to an example embodiment.

FIG. 10 is a flowchart illustrating a method of wireless power transfer between a first electronic device and a second electronic device schematically according to an embodiment.

In the following embodiments, operations may be performed sequentially, but are not necessarily performed sequentially. For example, the operations may be performed in different orders, and at least two of the operations may be performed in parallel.

In operation 1010, the first electronic device 310 may terminate charging. For example, the first electronic device 310 may terminate charging when a charging signal from a wireless charger device is not detected. The first electronic device 310 may terminate charging when a distance from the wireless charger device to the first electronic device 310 exceeds a threshold distance or when a battery of the first electronic device 310 is fully charged. The following operations may be operations after charging the first electronic device 310 by the wireless charger device performed in FIGS. 4 and 5 is suspended and/or terminated.

In operation 1020, the second electronic device 320 may determine a battery state. For example, the second electronic device 320 may determine a state of its own battery (e.g., the battery 324 of FIG. 3). The second electronic device 320 may determine a battery state identifier indicating one of a state in which the battery is absent, a state in which remaining battery power lacks, and a state in which the remaining battery power suffices. The state in which the battery is absent may be a state in which the second electronic device 320 is not provided with the battery or the battery is removed from the second electronic device 320. The state in which the remaining battery power lacks may be a state in which a state of charge (SoC) of the battery of the second electronic device 320 is less than a threshold. The state in which the remaining battery power is sufficient may be a state in which the SoC of the battery of the second electronic device 320 is less than or equal to the threshold. The threshold may be a value determined based on an expected power consumption according to one or more operations activated in the second electronic device 320. Although the threshold which is a criterion for determining whether the remaining battery power lacks has been described herein as an expected power consumption, embodiments are not limited thereto, and the threshold may be set to a value obtained by adding a margin power to the expected power consumption.

In operation 1030, a processor of the second electronic device 320 may generate power transmission-related information. The power transmission-related information may include at least one or a combination of two or more of a battery state identifier of the second electronic device 320, operation identification information indicating an operation executed by the second electronic device 320, required power information, a power transmission efficiency, or remaining battery power of the electronic device. Since each item of the power transmission-related information has been described above with reference to FIG. 3, a detailed description thereof will be omitted.

In operation 1040, a communication module of the second electronic device 320 may transmit the power transmission-related information to the first electronic device 310. A communication module of the first electronic device 310 may receive the power transmission-related information of the second electronic device 320 from the second electronic device 320.

In operation 1050, a processor of the first electronic device 310 may set, for each battery state, a wireless power transmission/reception module based on the power transmission-related information. For example, the first electronic device 310 may determine an amount of power to be transmitted to the first electronic device 310 based on the power transmission-related information.

Figure 11:
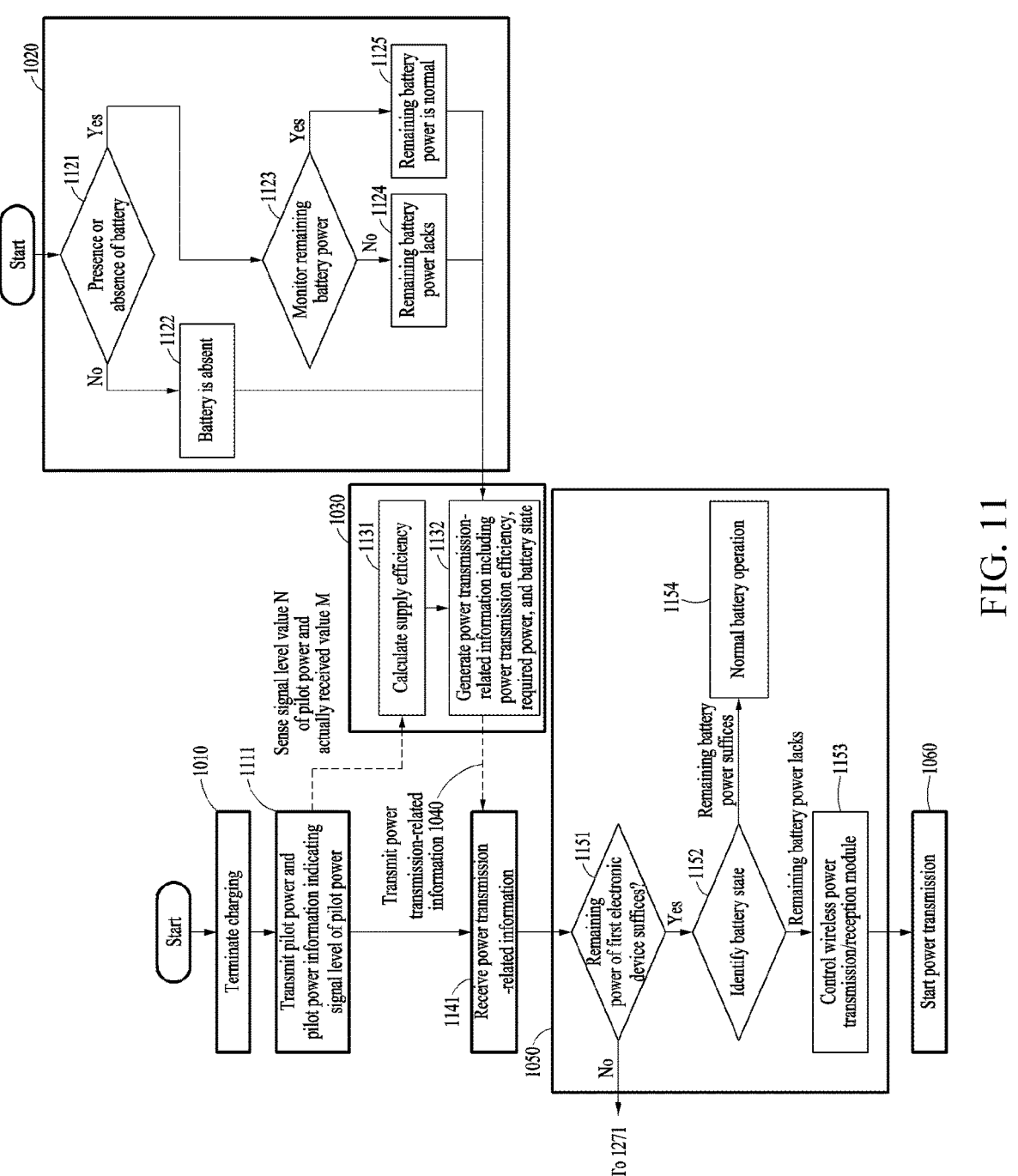
FIGS. 11 and 12 are flowcharts illustrating a method of dynamic wireless power transfer between a first electronic device and a second electronic device in detail according to an example embodiment.
Figure 12:
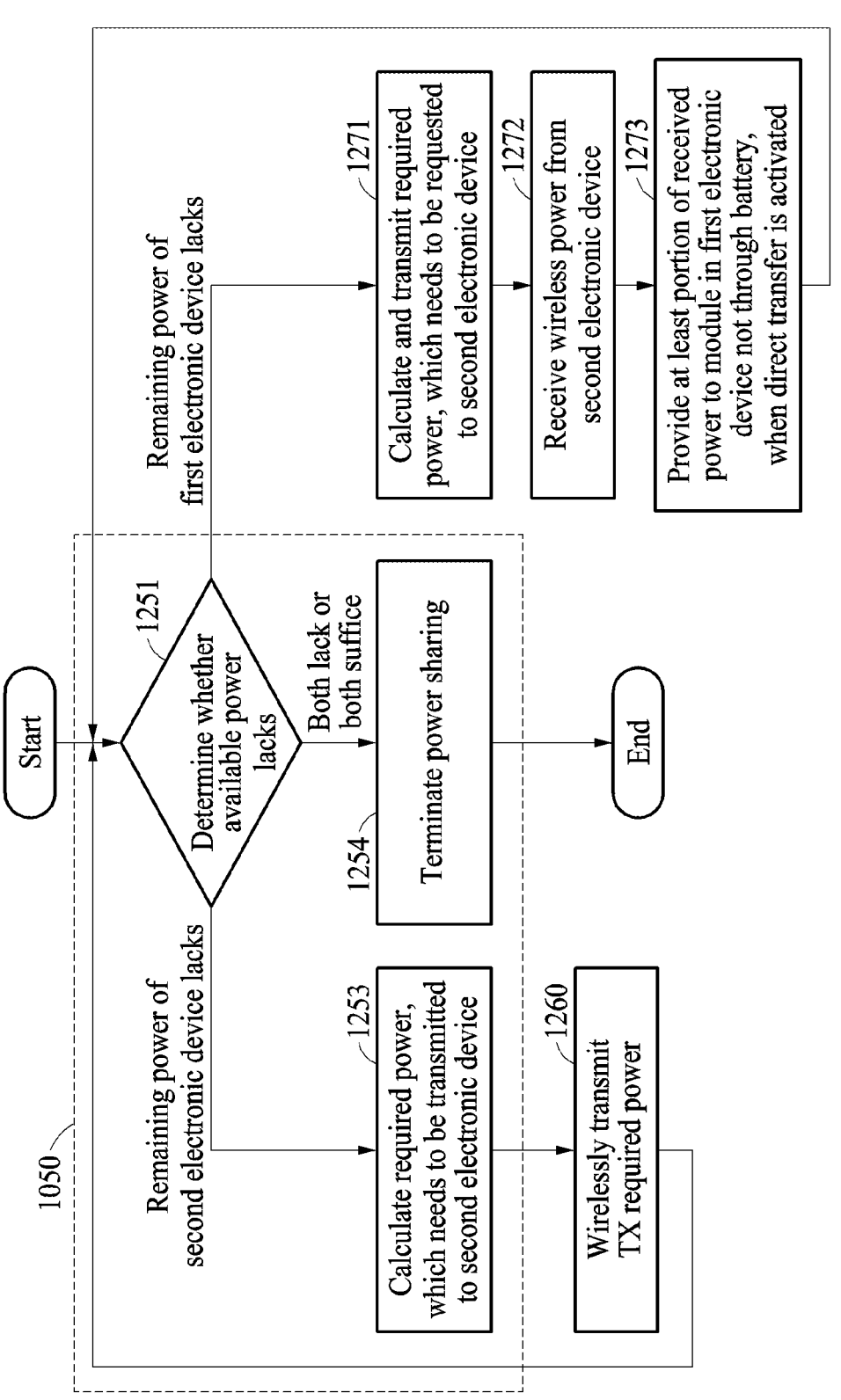

FIGS. 11 and 12 are flowcharts illustrating a method of dynamic wireless power transfer between a first electronic device and a second electronic device in detail according to an embodiment.

In the following embodiments, operations may be performed sequentially, but are not necessarily performed sequentially. For example, the operations may be performed in different orders, and at least two of the operations may be performed in parallel.

When charging is terminated in operation 1010, a first electronic device may transmit pilot power and pilot power information indicating a signal level of the pilot power to a second electronic device in operation 1111. The pilot power information may include a value of the signal level at which the pilot power is transmitted.

In operation 1020, the second electronic device may determine a battery state identifier. For example, in operation 1121, the second electronic device may determine whether a battery is present. In operation 1122, when a battery is absent, the second electronic device may determine a battery state identifier indicating that a battery is absent. The second electronic device provided without a battery may have remaining power that is always measured at "0" since only a resistor is connected to a circuit for checking remaining battery power, or may be configured to always determine a battery state identifier indicating that a battery is absent. The second electronic device having a detachable battery may determine a battery state identifier indicating that a battery is absent only when the battery is removed. In operation 1123, the second electronic device may monitor its remaining battery power. In operation 1124, the second electronic device may determine a battery state identifier indicating a lack of the battery when the remaining battery power is less than a threshold. In operation 1125, the second electronic device may determine a battery state identifier indicating that the remaining battery power is normal when the remaining battery power is greater than or equal to the threshold. The threshold may be a value determined based on an expected power consumption according to one or more operations activated in the second electronic device, which will be described later.

According to an embodiment, the first electronic device and the second electronic device may mutually share operation identification information related to an operation of an application to generate power transmission-related information. For example, a processor of the first electronic device may determine an operation to be executed with respect to the second electronic device in the application. The first electronic device may transmit operation identification information indicating the determined operation to the second electronic device through a communication module. The first electronic device may determine an operation to be automatically triggered by the second electronic device in response to execution of the application, or may select an operation to be executed in response to a user input for the application. The second electronic device may receive power transmission-related information including operation identification information from the first electronic device. The second electronic device may determine an operation to be autonomously triggered together with the operation identification information from the first electronic device. For example, when an application is executed, the first electronic device may transmit, to the second electronic device, operation identification information indicating driving of biometric sensors (e.g., a blood pressure sensor and a body temperature sensor) and inactivation of an auxiliary display in relation to the executed application. However, embodiments are not limited thereto, and as described above, even when operation identification information is not received from the first electronic device, the second electronic device may autonomously generate and/or load operation identification information indicating an operation related to an application through a hardware enable signal triggered when execution of the application is detected.

The second electronic device may calculate an expected power consumption based on the operation identification information and a power consumption designated for each operation. The second electronic device may determine one or more operations to be activated based on the operation identification information, and calculate the expected power consumption by summing power consumptions designated to the one or more operations. For example, the expected power consumption, which is the sum of an amount of power required to drive the biometric sensors and an amount of power required to drive the processor, may be 250 milliampere hours (mAh). In operation 1123 described above, the second electronic device may set the expected power consumption as a threshold, and compare the expected power consumption with the monitored remaining battery power. For example, when the remaining battery power is 200 mAh, the second electronic device may determine a battery state identifier indicating a lack of the remaining battery power since the remaining battery power is less than the expected power consumption of 250 mAh.

For reference, when it is required to drive an element on the first electronic device side in relation to the execution of the application, the first electronic device may calculate an expected power consumption as well. However, embodiments are not limited thereto, and the first electronic device and the second electronic device may identify operations to be driven respectively and generate operation identification information separately, or one of the first electronic device and the second electronic device may generate operation identification information of the entire system. The first electronic device and the second electronic device may each calculate an expected power consumption according to operation identification information by summing only the operations to be driven by itself, but embodiments are not limited thereto, and any one of the first electronic device and the second electronic device may calculate an expected power consumption of the entire system and an expected power consumption of each device.

In operation 1030, the second electronic device may generate power transmission-related information. According to an embodiment, in operation 1131, the second electronic device may calculate a power transmission efficiency. The second electronic device may receive the pilot power and the pilot power information transmitted in operation 1111, and sense an actually received value of the pilot power. The second electronic device may calculate the power transmission efficiency with a ratio of the signal level value of the pilot power indicated by the pilot power information to the actually received value. In operation 1132, the second electronic device may generate power transmission-related information including the power transmission efficiency, a required power, and a battery state identifier. For example, at an initial time when wireless power transfer between the first electronic device and the second electronic device is established, the first electronic device may transmit pilot power of 100 mA to the second electronic device. In addition, the first electronic device may transmit pilot power information indicating that the signal level value of the transmitted pilot power is 100 mA to the second electronic device through BLE. The second electronic device may sense that an actually received value of the wireless power is 50 mA through a fuel gauge. The second electronic device may calculate a power transmission efficiency by 50 mA/100 mA=50%, and store the calculated power transmission efficiency in a memory.

According to an embodiment, the second electronic device may calculate required power information based on the expected power consumption and the power transmission efficiency. For example, when the power transmission efficiency is 50% (e.g., in operation 1131 below), the first electronic device may need to supply wireless power of 500 mAh in order for the second electronic device to receive 250 mAh which is the expected power consumption. The first electronic device may determine the required power information by dividing the expected power consumption by the power transmission efficiency.

In operation 1040, the second electronic device may transmit, to the first electronic device through wireless communication (e.g., BLE), power transmission-related information including the battery state identifier, the required power information (e.g., 500 mAh), and the remaining battery power determined as described above. In operation 1141, the first electronic device may receive the power transmission-related information.

In operation 1050, the first electronic device may set a wireless power transmission/reception module based on the power transmission-related information. For example, in operation 1151, the first electronic device may determine whether the remaining power of the first electronic device is sufficient. In operation 1152, the first electronic device may identify a battery state of the second electronic device when the remaining battery power of the first electronic device suffices. In operation 1154, when remaining battery power of the second electronic device also suffices, both the first electronic device and the second electronic device may perform a normal battery operation.

In operation 1153, when the remaining battery power of the second electronic device lacks, the first electronic device may control the wireless power transmission/reception module. For example, the first electronic device may adjust an amount of power to be transmitted to the second electronic device by controlling a power transmission duty ratio of the wireless power transmission/reception module based on the power transmission-related information. When the power transmission duty ratio is "1", the first electronic device may continuously transmit wireless power according to a resonant frequency to the second electronic device. When the power transmission duty ratio is "0.5", the first electronic device may transmit wireless power according to the resonant frequency during a first period (e.g., a half period) and disable the power transmission during a second period (e.g., the other half period), in a given period. For example, a processor of the first electronic device may control the wireless power transmission/reception module to transmit a first amount of power to the second electronic device, in response to at least one of a case where a battery is absent from the second electronic device or a case where remaining battery power of the second electronic device lacks. The first amount of power may be an amount of power transmitted with a first power transmission duty ratio (e.g., "1").

In operation 1060, the first electronic device may start power transmission to the second electronic device. The first electronic device may recollect power transmission information that dynamically changes during the power transmission and adjust an amount of wireless power to be transmitted by the wireless power transmission/reception module based on the recollected power transmission information. For example, the first electronic device may adjust the amount of wireless power to be transmitted in response to a change in at least one of a wireless power transmission efficiency, an operation activated by an application, an expected power consumption, required power information, and remaining battery power. The amount of wireless power to be transmitted may be controlled by the power transmission duty ratio described above.

In addition, although an example of the first electronic device adjusting the amount of wireless power to be transmitted has been mainly described, embodiments are not limited thereto. When the second electronic device receives excessive or insufficient wireless power compared to the expected amount, the second electronic device may newly calculate required power information by itself and actively request power transmission according to the newly calculated required power information from the first electronic device.

According to an embodiment, after power transfer is started, a processor of the second electronic device may activate an element corresponding to at least one of an operation triggered in response to execution of an application and an operation indicated by operation identification information received from an external device. For example, in response to the second electronic device from which a battery is absent or of which remaining battery power lacks receiving wireless power from the first electronic device, the second electronic device may activate one or more elements corresponding to the operation indicated by the operation identification information.

Also, when the second electronic device has a battery, the first electronic device may reduce the amount of power to a second amount of power that is less than the first amount of power as the battery of the second electronic device is charged. The second amount of power may be an amount of power transmitted with a second power transmission duty ratio (e.g., "0.8") that is less than the first power transmission duty ratio. The first electronic device may gradually reduce the amount of power to be transmitted as the remaining battery power of the second electronic device increases. The first electronic device may suspend wireless power transfer in response to the remaining battery power of the second electronic device exceeding a target value. The second electronic device may suspend wireless power reception and normally operate using the battery in response to the remaining battery power charged in its own battery exceeding the target value.

For reference, the entity that performs each operation in FIG. 11 is not limited to the first electronic device or the second electronic device. Unless otherwise described, the operation of the first electronic device and the operation of the second electronic device may be replaced with each other. For example, the first electronic device may perform the operation of the second electronic device, and the second electronic device may perform the operation of the first electronic device. The first electronic device and the second electronic device may perform dynamic wireless power transfer.

FIG. 12 illustrates operation 1050 described above.

In operation 1251, the first electronic device may determine whether available power lacks. The available power may include remaining battery power of the first electronic device and remaining battery power of the second electronic device. The first electronic device may compare an expected power consumption required for an operation to be executed in the first electronic device and the remaining battery power of the first electronic device, and compare an expected power consumption required for an operation to be executed in the second electronic device and the remaining battery power of the second electronic device.

In operation 1253, when the remaining power of the second electronic device lacks, the first electronic device may calculate required power information to be transmitted to the second electronic device. For example, when the remaining battery power of the second electronic device is less than the expected power consumption required for the operation to be executed in the second electronic device, the first electronic device may calculate the required power information, which needs to be transmitted to the second electronic device. In operation 1260, the first electronic device may wirelessly transmit TX required power to the second electronic device.

In operation 1254, when the remaining battery power of the first electronic device and the remaining battery power of the second electronic device both lack or both suffice, the first electronic device and the second electronic device may terminate power sharing.

In operation 1271, when the remaining power of the first electronic device lacks, the first electronic device may calculate and transmit required power information, which needs to be requested from the second electronic device. In operation 1272, the first electronic device may receive wireless power from the second electronic device. In operation 1273, the first electronic device may supply at least a portion of the received power to a module and/or an element in the first electronic device not through a battery, when direct transfer is activated in the first electronic device. For example, the first electronic device may supply at least a portion of the power received from the external device to an element in the electronic device not through the battery, in response to remaining battery power of the electronic device lacking and a direct transfer path between the wireless power transmission/reception module and another module in the electronic device being activated, while charging by the wireless charger device is not detected.

Although it has been described the operations of FIG. 12 are performed by the first electronic device, embodiments are not limited thereto. A portion of the operations of FIG. 12 may be performed by the second electronic device. In addition, the roles of the first electronic device and the second electronic device may be exchanged to perform the operations of FIG. 12. For example, in operation 1271, 1272, and 1273, the second electronic device may supply at least a portion of the power received from the first electronic device to an element in the second electronic device not through the battery, in response to remaining battery power of the second electronic device lacking and a direct transfer path between the wireless power transmission/reception module and another module in the second electronic device being activated, while charging the first electronic device by the wireless charger device is not detected.

The activation of the direct transfer path will be described below with reference to FIGS. 13 and 14.

Figure 13:
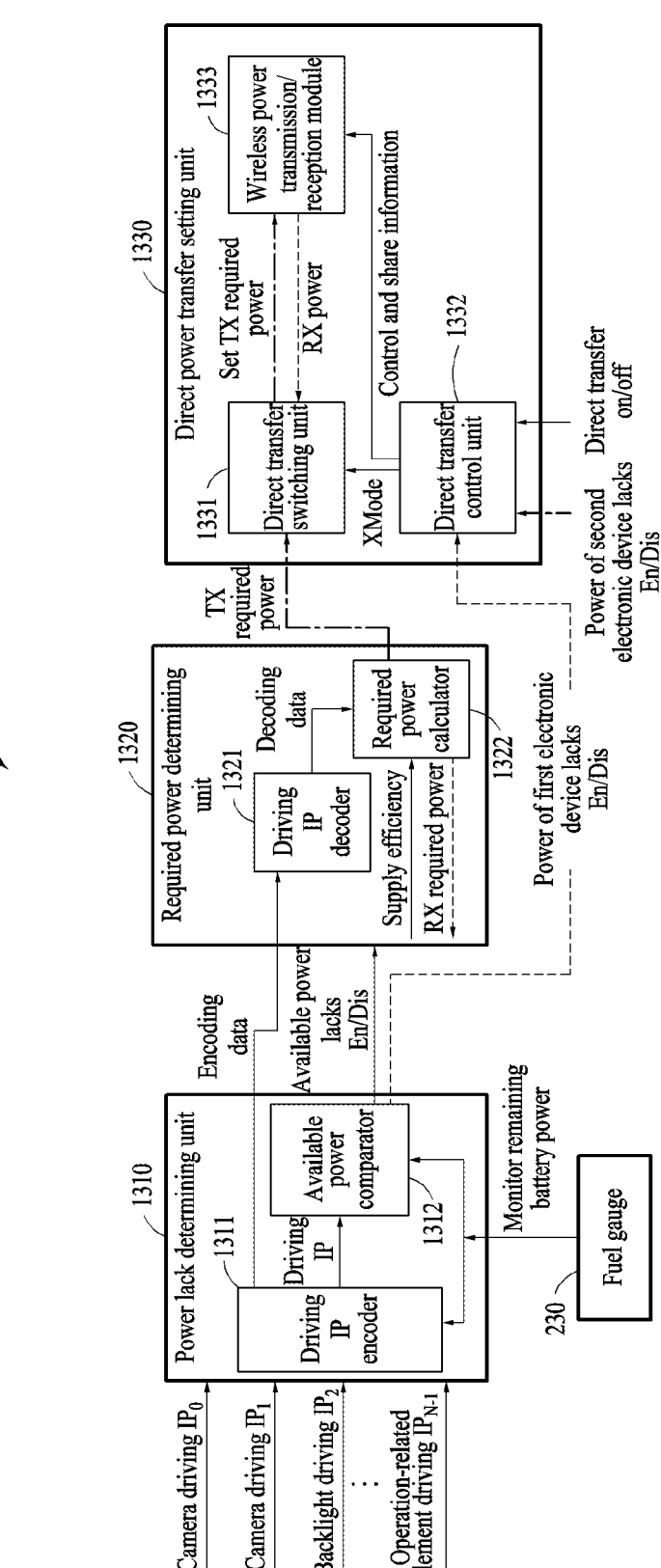
FIGS. 13 and 14 are diagrams illustrating a power transmission/reception setting operation of a first electronic device according to an example embodiment.
Figure 14:
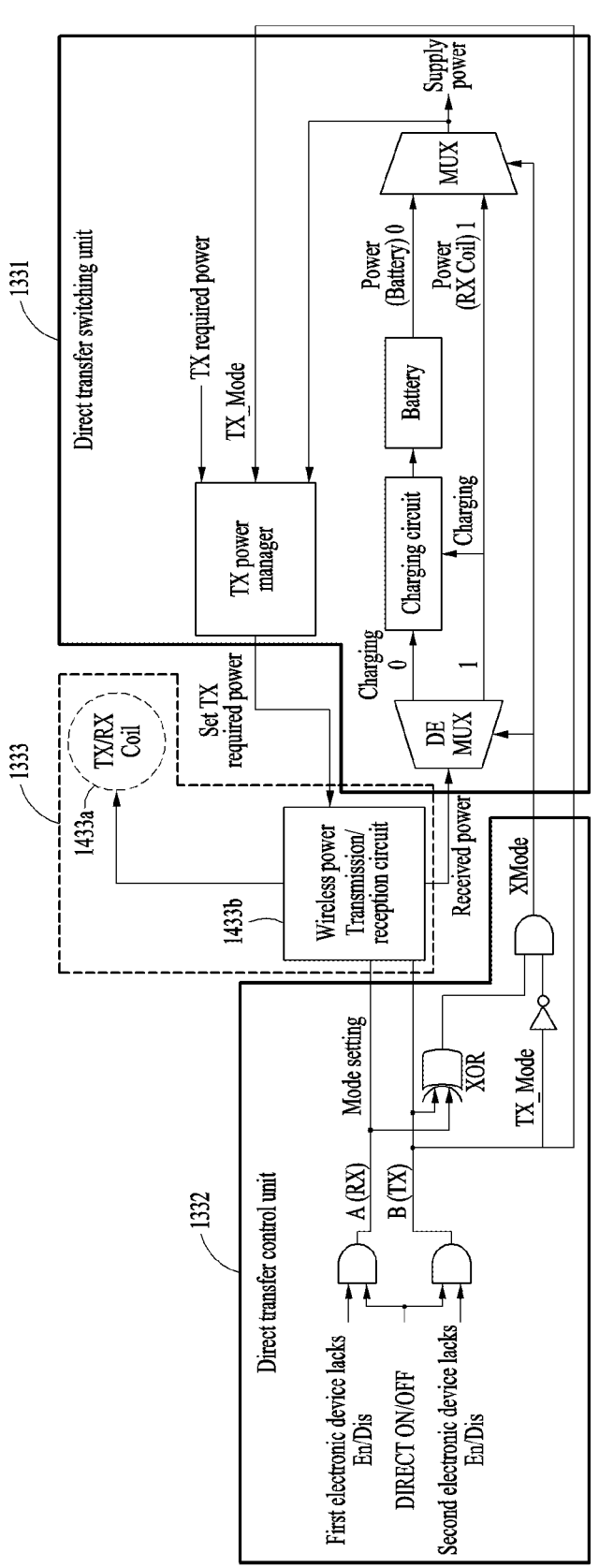

FIGS. 13 and 14 are diagrams illustrating a power transmission/reception setting operation of a first electronic device according to an embodiment.

A first electronic device 1300 (e.g., the first electronic device 310 of FIG. 3) shown in FIG. 13 may include a power lack determining unit 1310, a required power determining unit 1320, and a direct power transfer setting unit 1330.

The power lack determining unit 1310 may determine whether available power lacks. The power lack determining unit 1310 may include a driving IP encoder 1311 and an available power comparator 1312.

The driving IP encoder 1311 may encode operation identification information indicating operations executed by the first electronic device 1300 and a second electronic device. For example, FIG. 13 shows N operations that are executable in an application, wherein $IP_0$ may be a camera driving operation, $IP_1$ may be a payment driving operation, $IP_2$ may be a backlight driving operation, and $IP_{N-1}$ may be an (N–1)-th operation. Each operation may be executed through activation of an element in the first electronic device 1300 and/or an element in the second electronic device. The driving IP encoder 1311 may transmit data in which the operation identification information is encoded to the required power determining unit 1320, and transmit an identifier indicating an operation to be driven to the available power comparator 1312.

For example, N=3, and a camera and a backlight may be simultaneously driven by the application. The driving IP encoder 1311 may generate 3/101/2/3 as the encoded data. "3" denotes 3 bits, may correspond to N indicating the total number of operations related to the application, and may be set by an initial developer. "101" may indicate camera On, payment Off, and backlight On. Then, "2" may indicate driving two (e.g., driving both the camera and the backlights simultaneously). It could be for double checking. "3" may indicate that the remaining battery power is 3%.

The fuel gauge 230 may monitor the remaining battery power of the first electronic device 1300 and transmit the monitoring result to the driving IP encoder 1311 and the available power comparator 1312.

The available power comparator 1312 may compare the expected power consumption for the operation to be driven with the remaining battery power of the first electronic device 1300 and the remaining battery power of the second electronic device. The available power comparator 1312 may determine that the available power lacks when the remaining battery power of any one of the first electronic device 1300 and the second electronic device is insufficient to execute the operation related to the application in the corresponding device. The available power comparator 1312 may activate the required power determining unit 1320 when it is determined that the available power lacks and cause the required power determining unit 1320 to sleep when it is determined that the available power suffices, thereby minimizing or reducing power consumption. In addition, the available power comparator 1312 may activate the direct power transfer setting unit 1330 when the remaining power of the first electronic device 1300 lacks, and cause the direct power transfer setting unit 1330 to sleep when the remaining power of the first electronic device 1300 suffices.

The required power determining unit 1320 may determine the required power that the first electronic device 1300 needs to transmit to the second electronic device and the required power that the first electronic device 1300 needs to receive from the second electronic device. The required power determining unit 1320 may include a driving IP decoder 1321 and a required power calculator 1322.

The driving IP decoder 1321 may be implemented to correspond to the driving IP encoder 1311. The driving IP decoder 1321 may generate operation identification information by decoding the encoded data transmitted from the driving IP encoder 1311. The driving IP decoder 1321 may transmit the operation identification information to the required power calculator 1322. The required power calculator 1322 may calculate required power information based on the wireless power transmission efficiency and the operation identification information.

For example, the required power calculator 1322 may calculate an expected power consumption by summing power consumptions designated to operations executed by the first electronic device 1300, and calculate RX required power based on the expected power consumption and the wireless power transmission efficiency. The first electronic device 1300 may request wireless power transfer while transmitting the RX required power to the second electronic device.

As another example, the required power calculator 1322 may calculate an expected power consumption by summing power consumptions designated to operations executed by the second electronic device, and calculate TX required power based on the expected power consumption and the wireless power transmission efficiency. The required power calculator 1322 may provide the TX required power to the direct power transfer setting unit 1330.

The direct power transfer setting unit 1330 may set whether to activate a direct transfer path for power received through activates a direct transfer path for power received through a wireless power transmission/reception module 1333 (e.g., the wireless power transmission/reception modules 311 or 321 of FIG. 3). The direct power transfer setting unit 1330 may include a direct transfer switching unit 1331, a direct transfer control unit 1332, and the wireless power transmission/reception module 1333. In transmitting power to the second electronic device, the direct power transfer setting unit 1330 may select and activate a wireless power transmission circuit in the wireless power transmission/reception module 1333. When direct transfer setting is activated in receiving power by the first electronic device 1300, the direct power transfer setting unit 1330 may use at least a portion of the power received through the wireless power transmission/reception module 1333 for power supply not through the battery. The operation of the direct power transfer setting unit 1330 will be described in detail below with reference to FIG. 14.

For reference, the first electronic device 1300 and the second electronic device may communicate through Bluetooth (e.g., BLE), or may communicate by loading data through the Qi protocol. For example, switching the direct transfer path may reduce system latency and reduce system timing errors in the Qi protocol.

FIG. 14 illustrates an exemplary logic circuit of a direct power transfer setting unit.

The direct transfer control unit 1332 and the direct transfer switching unit 1331 may be implemented as a combination of logic gates (e.g., an AND gate, an XOR gate, an INV gate, a MUX, and a DEMUR). The logic gates may be implemented as hardware elements (e.g., transistors), but embodiments are not limited thereto. A logic table of the direct transfer control unit 1332 and the direct transfer switching unit 1331 of FIG. 14 may be shown in Table 1 below.

TABLE 1

| First electronic device lacks En/Dis | Second electronic device lacks En/Dis | Direct ON/OFF | A | B/TX_mode | XOR | Xmode | Remarks |
|---|---|---|---|---|---|---|---|
| 0 | 0 | 0 | 0 | 0 | 0 | 0 | Normal battery operation |
| 0 | 1 | 0 | 0 | 0 | 0 | 0 | Normal battery operation |
| 1 | 0 | 0 | 0 | 0 | 0 | 0 | Normal battery operation |
| 1 | 1 | 0 | 0 | 0 | 0 | 0 | Normal battery operation |
| 0 | 0 | 1 | 0 | 0 | 0 | 0 | Normal battery operation |
| 1 | 0 | 1 | 1 | 0 | 1 | 1 | Absence of battery/ Remaining battery power lacks |
| 0 | 1 | 1 | 0 | 1 | 1 | 0 | Power transmission setting |
| 1 | 1 | 1 | 1 | 1 | 0 | 0 | Normal battery operation |

In Table 1 above, the first column shows enable signals that are activated when the remaining battery power of the first electronic device lacks, the second column shows enable signals that are activated when the remaining battery power of the second electronic device lacks, and the third column shows enable signals that are activated when direct transfer is set. Direct transfer may be set by the initial setting of an application and/or the control of a user.

When direct transfer is not set, Xmode=0 may be satisfied. Thus, the first electronic device may operate using its own battery (e.g., the battery 314 of FIG. 3). When the remaining battery power lacks, the first electronic device may first charge the battery through a charging circuit with wireless power received from a wireless charger device and/or the second electronic device, and supply power using the battery. When the remaining battery power of the first electronic device and the remaining battery power of the second electronic device both suffice or both lack although direct transfer is set, the first electronic device may operate using its own battery (e.g., perform normal battery operation).

When the remaining battery power of the first electronic device lacks and the remaining battery power of the second electronic device suffices, an application executed by the first electronic device may set direct transfer. In this case, Xmode=1 may be satisfied. Thus, the first electronic device may use at least a portion of the power received through a transmission/reception coil 1433*a* (e.g., the coil 321*a* of FIG. 3) and a wireless power transmission/reception circuit (e.g., the wireless power transmission/reception circuit 321*b* of FIG. 3) of the wireless power transmission/reception module 1333 for power supply not through the battery. The direct transfer switching unit 1331 may use the power remaining after the power supply to charge the battery through the charging circuit.

When the remaining battery power of the first electronic device suffices and the remaining battery power of the second electronic device lacks in a state in which direct power transfer is set, the first electronic device may perform power transmission setting. For example, a TX power manager of the first electronic device may set the wireless power transmission/reception circuit 1433*b* according to the TX required power in response to TX_Mode=1, and transmit wireless power to the second electronic device using the power of the battery.

Among the modules shown in FIGS. 13 and 14, the modules other than the wireless power transmission/reception module may be implemented as a combination of a software module and a hardware module or as a hardware module. In addition, although the first electronic device has been mainly described with reference to FIGS. 13 and 14, embodiments are not limited thereto, and the second electronic device may also include, similar to the first electronic device, a power lack determining unit, a required power determining unit, and a direct power transfer setting unit. For example, in comparing available power, the second electronic device may determine whether the remaining battery power of the second electronic device lacks based on a comparison between an expected power consumption required to activate an element corresponding to an operation executed by the second electronic device and the remaining battery power of the second electronic device. "Based on" as used herein covers based at least on.

Figure 15:
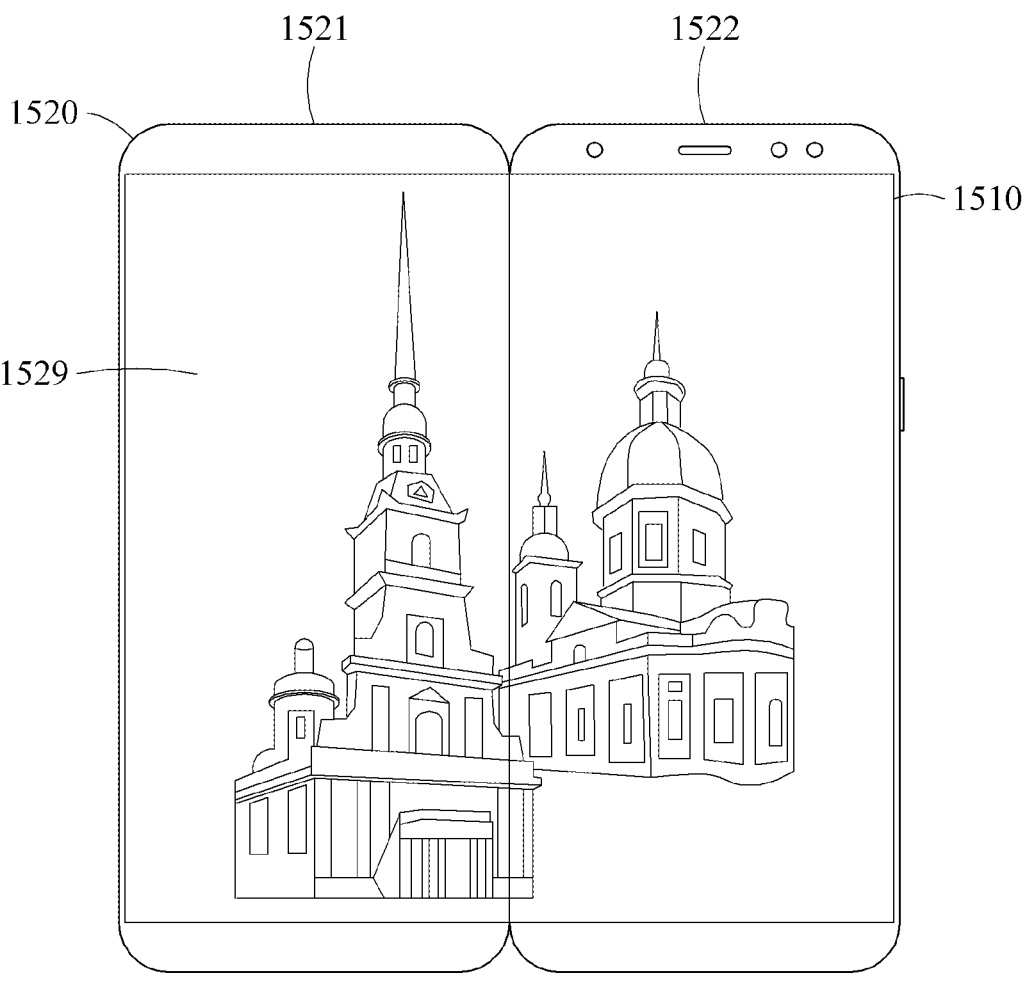
FIGS. 15 and 16 illustrate an example of a first electronic device and a second electronic device being coupled according to an example embodiment.
Figure 16:
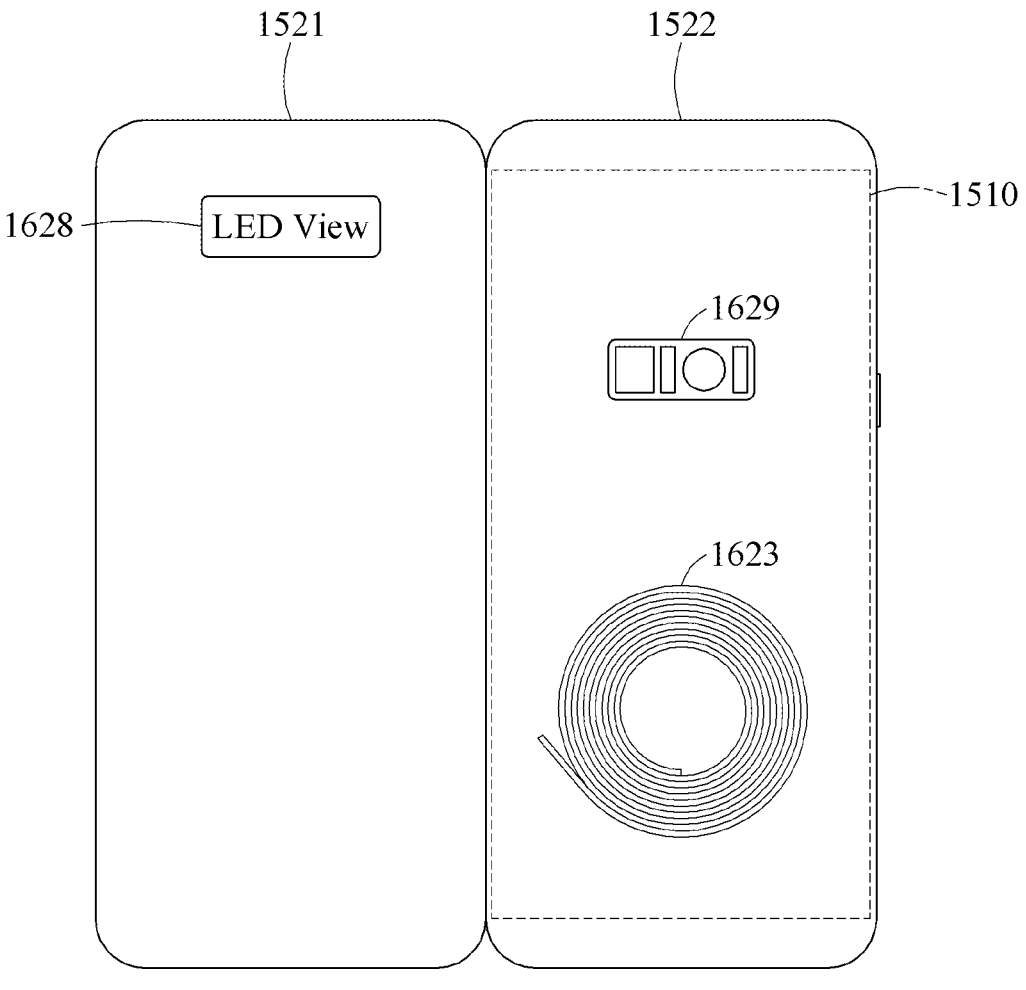

FIGS. 15 and 16 illustrate an example of a first electronic device and a second electronic device being coupled according to an embodiment.

A second electronic device 1520 may include, for example, a main body 1522 to be coupled to a first surface (e.g., a rear surface) of a first electronic device 1510 and a cover part 1521 to cover a second surface (e.g., a front surface) of the first electronic device 1510. An auxiliary display 1628 may be disposed on one surface of the cover part 1521. An expanded display 1529 may be disposed on the other surface of the cover part 1521. The expanded display 1529 may display a screen connected to a main display of the first electronic device 1510.

A biometric sensor 1629 may be disposed on one surface of the main body 1522, and a coil 1623 (e.g., the coil 321a of FIG. 3) may be accommodated in the main body.

As described above, by isolating the coil 1623 of the second electronic device 1520 from a wireless power transmission/reception circuit (e.g., the wireless power transmission/reception circuit 321b of FIG. 3), the wireless power transmission efficiency between the first electronic device 1510 and a wireless charger device (e.g., the wireless charger device 930 of FIG. 9) may be increased. Even when a battery is absent from the second electronic device 1520, the first electronic device 1510 may dynamically monitor power required by the second electronic device 1520 and supply wireless power thereto as described above.

Figure 17:
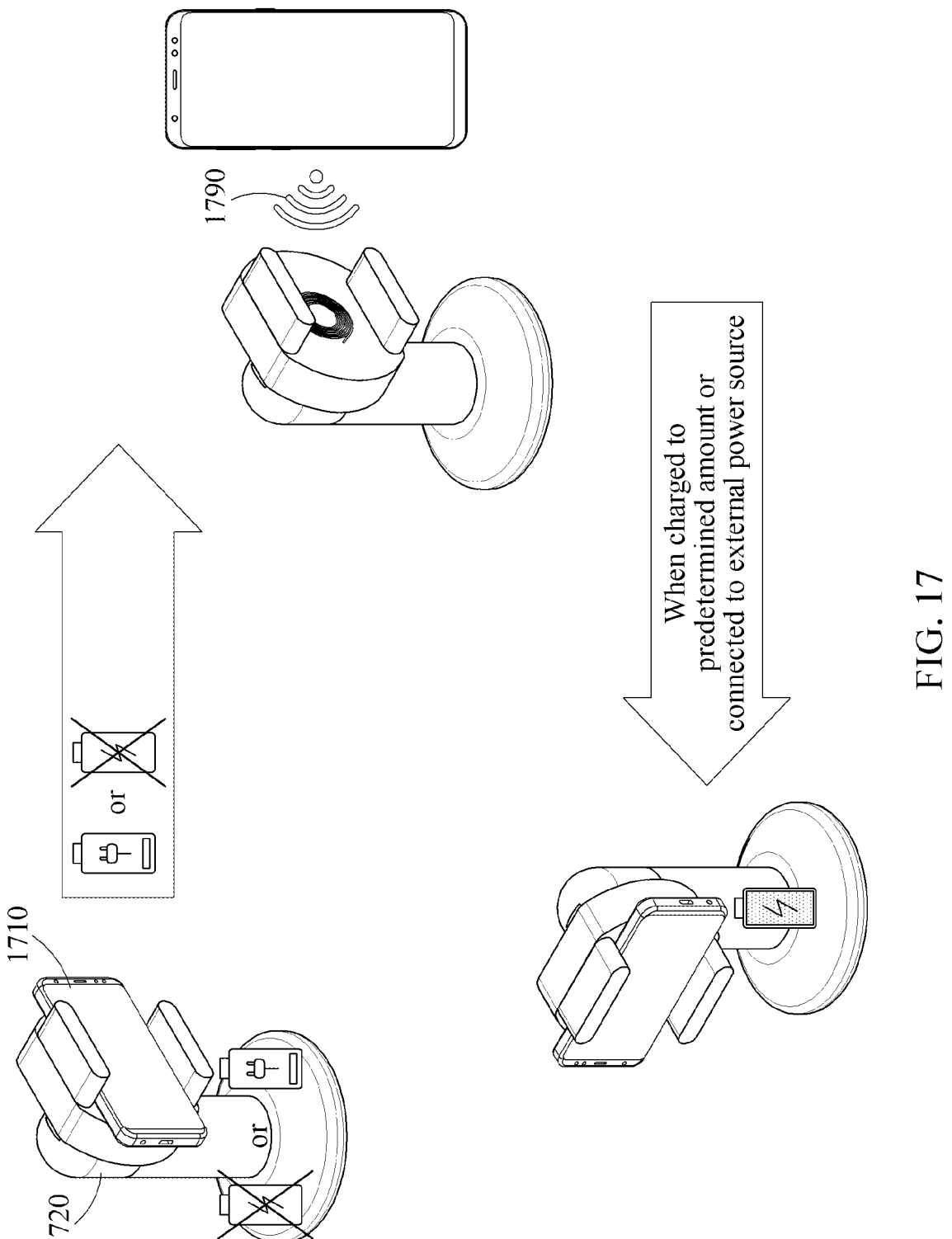
FIG. 17 illustrates another example of a first electronic device and a second electronic device being coupled according to an example embodiment.

FIG. 17 illustrates another example of a first electronic device and a second electronic device being coupled according to an embodiment.

According to an embodiment, a second electronic device 1720 may request power sharing from a first electronic device 1710 when remaining battery power lacks or an external power source is disconnected. The first electronic device 1710 may monitor a battery state of the second electronic device 1720. For example, the first electronic device 1710 may receive a battery identifier from the second electronic device 1720 as described above. The first electronic device 1710 may transmit wireless power to the second electronic device 1720 when the remaining battery power of the second electronic device 1720 lacks or the external power source is disconnected. A description of wireless power transfer 1790 between the first electronic device 1710 and the second electronic device 1720 has been described in detail above with reference to FIGS. 1 to 16 and thus, will be omitted.

A processor of the second electronic device 1720 may suspend power reception from the first electronic device 1710, in response to at least one of a case where an external power source is connected to the electronic device and a case where the remaining battery power is greater than or equal to a threshold. The second electronic device 1720 may operate using the battery or using the power supplied by the external power source.

For example, the second electronic device 1720 may be a face tracking device. A large amount of power may be required to drive a motor of the face tracking device. According to an embodiment, the second electronic device 1720 may receive power shared by the first electronic device 1710 even when an external power source is absent, and thus, the second electronic device 1720 may have improved mobility.

Further, when the remaining battery power of the first electronic device 1710 lacks, the second electronic device 1720 may transmit wireless power to the first electronic device 1710. In other words, wireless power transmission and wireless power reception between the first electronic device 1710 and the second electronic device 1720 may dynamically switch in real time.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:
a processor;
a memory electrically connected to the processor;
a wireless power transmission/reception module, comprising circuitry, configured to perform wireless power transfer with at least one of a wireless charger device and an external device;
a battery configured to be charged by power received from the wireless charger device; and
a communication module, comprising communication circuitry, configured to establish communication with the external device,
wherein the processor is configured to:
control to transmit charging identification information indicating a start of charging the electronic device to the external device through at least the communication module, in response to at least detecting a charging signal from the wireless charger device,
receive power provided from the wireless charger device through at least the wireless power transmission/reception module, at least by bypassing the external device after power reception of the external device is deactivated, and
control to charge the battery using the power received from the wireless charger device.

2. The electronic device of claim 1, wherein
the wireless power transmission/reception module is configured to receive, from the wireless charger device, power bypassing an external device of which a coil and a wireless power transmission/reception circuit are disconnected, while the electronic device is being charged by the wireless charger device.

3. The electronic device of claim 1, wherein
the processor is configured to:
store, based on the electronic device receiving the charging signal, status information of an application being executed at a time when the charging signal is received and suspend the application, and
load, based on charging the electronic device being terminated, status information stored at a time when the charging is started.

4. The electronic device of claim 1, wherein
the wireless power transmission/reception module is configured to:
based on toggle charging being set, repeat an operation of suspending power reception from the wireless charger device while a coil of the external device is activated and an operation of resuming power reception from the wireless charger device while the coil of the external device is deactivated until charging the electronic device is terminated after charging the electronic device is started by receiving the charging signal, and
based on non-toggle charging being set, continue power reception from the wireless charger device until charging the electronic device is terminated after charging the electronic device is started by receiving the charging signal.

5. The electronic device of claim 1, wherein
the communication module is configured to receive, from the external device, power transmission-related information comprising at least one or a combination of two or more of a battery state identifier, operation identification information indicating an operation executed by the external device, required power information, a power transmission efficiency, or remaining battery power of the external device, and the processor is configured to determine an amount of power to be transmitted to the external device based on the received power transmission-related information.

6. The electronic device of claim 1, wherein the processor is configured to determine an operation to be executed with respect to the external device in an application, and control to transmit operation identification information indicating the determined operation to the external device through the communication module.

7. The electronic device of claim 1, wherein the processor is configured to supply at least a portion of the power received from the external device to an element in the electronic device not through the battery, in response to remaining battery power of the electronic device lacking and a direct transfer path between the wireless power transmission/reception module and another module, comprising circuitry, in the electronic device being activated, while charging by the wireless charger device is not detected.

8. The electronic device of claim 1, wherein the processor is configured to adjust an amount of power to be transmitted to the external device at least by controlling a power transmission duty ratio of the wireless power transmission/reception module based on power transmission-related information.

9. The electronic device of claim 1, wherein the processor is configured to:

control the wireless power transmission/reception module to transmit a first amount of power to the external device, in response to at least one of a case where a battery is absent from the external device or a case where remaining battery power of the external device lacks, and when the external device comprises a battery, reduce an amount of power to a second amount of power that is less than the first amount of power as the battery of the external device is charged.

10. A method, implemented by a processor of an electronic device, the method comprising:

deactivating power reception of a wireless power transmission/reception module, comprising circuitry, performing wireless power transfer with an external device disposed on an opposite side of a wireless charger device based on the electronic device, in response to charging identification information indicating a start of charging the external device being received from the external device; and transmitting power provided from the wireless charger device to the external device at least by bypassing the electronic device after power reception of the electronic device is deactivated.

11. The method of claim 10, comprising:

disconnecting a coil and a wireless power transmission/reception circuit included in the wireless power transmission/reception module to isolate the coil from the wireless power transmission/reception circuit, while the external device is being charged by the wireless charger device.

12. The method of claim 10, wherein the method comprises:

in response to charging identification information indicating a start of charging the external device being received, deactivating one or more elements corresponding to an operation being executed by an application at a time when the charging identification information is received;

storing status information of the application being executed at the time when the charging identification information is received in the memory; and in response to charging the external device being terminated, loading status information stored at a time when charging the external device is started and resuming the operation related to the application.

13. The method of claim 10, comprising:

in a case where toggle charging is set, repeating an operation of connecting a coil of the electronic device to a wireless power transmission/reception circuit and an operation of disconnecting the coil from the wireless power transmission/reception circuit until charging the external device is terminated after charging the external device is started by receiving the charging signal; and in a case where non-toggle charging is set, maintaining the coil to be disconnected from the wireless power transmission/reception circuit.

14. The method of claim 10, comprising:

transmitting power transmission-related information comprising at least one or a combination of two or more of a battery state identifier of the electronic device, operation identification information indicating an operation executed by the electronic device, required power information, a power transmission efficiency, or remaining battery power of the electronic device; and activating an element corresponding to at least one of an operation triggered in response to execution of an application and an operation indicated by operation identification information received from the external device.

15. The method of claim 10, comprising:

supplying at least a portion of the power received from the external device to an electronic element in the electronic device not through the battery, in response to remaining battery power of the electronic device lacking and a direct transfer path between the wireless power transmission/reception module and another electronic module, comprising circuitry, in the electronic device being activated, while charging the external device by the wireless charger device is not detected;

determining whether remaining battery power of the electronic device lacks based on a comparison between at least an expected power consumption required to activate an element corresponding to an operation executed by the electronic device and the remaining battery power of the electronic device; and suspending power reception from the external device in response to at least one of a case where an external power source is connected to the electronic device and a case where remaining battery power is greater than or equal to a threshold.

* * * * *